(12) United States Patent
Hatakeyama

(10) Patent No.: US 8,544,066 B2
(45) Date of Patent: Sep. 24, 2013

(54) ACCESS RIGHT MANAGEMENT SYSTEM, ACCESS RIGHT MANAGEMENT METHOD, AND ACCESS RIGHT MANAGEMENT PROGRAM

(75) Inventor: Makoto Hatakeyama, Tokyo (JP)

(73) Assignee: NEC Corporation, Tokyo (JP)

( * ) Notice: Subject to any disclaimer, the term of this patent is extended or adjusted under 35 U.S.C. 154(b) by 420 days.

(21) Appl. No.: 12/735,120

(22) PCT Filed: Dec. 25, 2008

(86) PCT No.: PCT/JP2008/073644
§ 371 (c)(1),
(2), (4) Date: Jun. 17, 2010

(87) PCT Pub. No.: WO2009/084601
PCT Pub. Date: Jul. 9, 2009

(65) Prior Publication Data
US 2010/0281522 A1 Nov. 4, 2010

(30) Foreign Application Priority Data
Dec. 27, 2007 (JP) ................................. 2007-335988

(51) Int. Cl.
*G06F 21/20* (2006.01)
*H04L 9/32* (2006.01)

(52) U.S. Cl.
USPC .......... 726/4; 726/2; 726/3; 726/12; 713/168; 713/175; 705/51

(58) Field of Classification Search
USPC ............... 726/1–7, 10, 12, 21; 713/168, 172, 713/175; 705/51, 59, 901, 902, 904
See application file for complete search history.

(56) References Cited

U.S. PATENT DOCUMENTS

2004/0034774 A1* 2/2004 Le Saint .................. 713/169
2006/0021065 A1* 1/2006 Kamperman et al. ........ 726/28
(Continued)

FOREIGN PATENT DOCUMENTS

JP 2002-063444(A) 2/2002
JP 2002-251573 9/2002
(Continued)

OTHER PUBLICATIONS

Qiong Liu et al, Digital Rights Management for Content Distribution, Australian Computer Society, 2003.*
(Continued)

*Primary Examiner* — Philip Chea
*Assistant Examiner* — Shanto M Abedin
(74) *Attorney, Agent, or Firm* — McGinn Intellectual Property Law Group, PLLC

(57) ABSTRACT

An authentication device includes a user authentication certificate generation unit that issues to another device user authentication information on which information about a user is recorded; and a right transfer certificate/token generation unit that issues right transfer information and a token corresponding to the right transfer information to another device on the basis of information about a user to whom the right is transferred and a condition under which the right is transferred. A service proxy access device includes a token request unit that requests the issuing of the right transfer information and the token in order to access another device; and a user proxy access unit that accesses another service using the token. The service providing device includes a user authentication certificate request unit that acquires user authentication information from the authentication device using the token.

17 Claims, 19 Drawing Sheets

(56) References Cited

U.S. PATENT DOCUMENTS

| | | | |
|---|---|---|---|
| 2006/0143189 A1 | 6/2006 | Imaeda et al. | |
| 2006/0206925 A1 | 9/2006 | Dillaway et al. | |
| 2006/0206932 A1 | 9/2006 | Chong | |
| 2007/0245414 A1* | 10/2007 | Chan et al. | 726/12 |
| 2007/0250912 A1* | 10/2007 | Rassool et al. | 726/4 |
| 2008/0154778 A1* | 6/2008 | Lee et al. | 705/51 |
| 2008/0263649 A1* | 10/2008 | Smadja et al. | 726/9 |
| 2009/0064280 A1* | 3/2009 | Babeanu et al. | 726/3 |
| 2009/0113536 A1* | 4/2009 | Zhang et al. | 726/12 |

FOREIGN PATENT DOCUMENTS

| | | |
|---|---|---|
| JP | 2006-4314 | 1/2006 |
| JP | 2006-195844 | 7/2006 |
| JP | 2006-254464 | 9/2006 |
| JP | 2006-260538 | 9/2006 |
| JP | 2007-28049 | 2/2007 |
| JP | 2007-149010 | 6/2007 |
| JP | 2007-226470 | 9/2007 |
| JP | 2007-233705 | 9/2007 |
| JP | 2008-198032(A) | 8/2008 |
| WO | WO 2005/006204 A1 | 1/2005 |
| WO | WO 2009/041319 A1 | 4/2009 |

OTHER PUBLICATIONS

Daiki Nobayashi et al, Development of Single Sign-On System with Hardware Token and Key Management Server, IEEE, 2007.*
OASIS, "Assertions and Protocol for the OASIS Security Assertion Markup Language (SAML)V2.0," [online], Mar. 15, 2005, (searched on Nov. 26, 2007), Internet, <URL: http://docs.oasis-open.org/security/saml/v2.0/saml-core-2.0-os.pdf>.
Japanese Office Action dated Aug. 6, 2013.

* cited by examiner

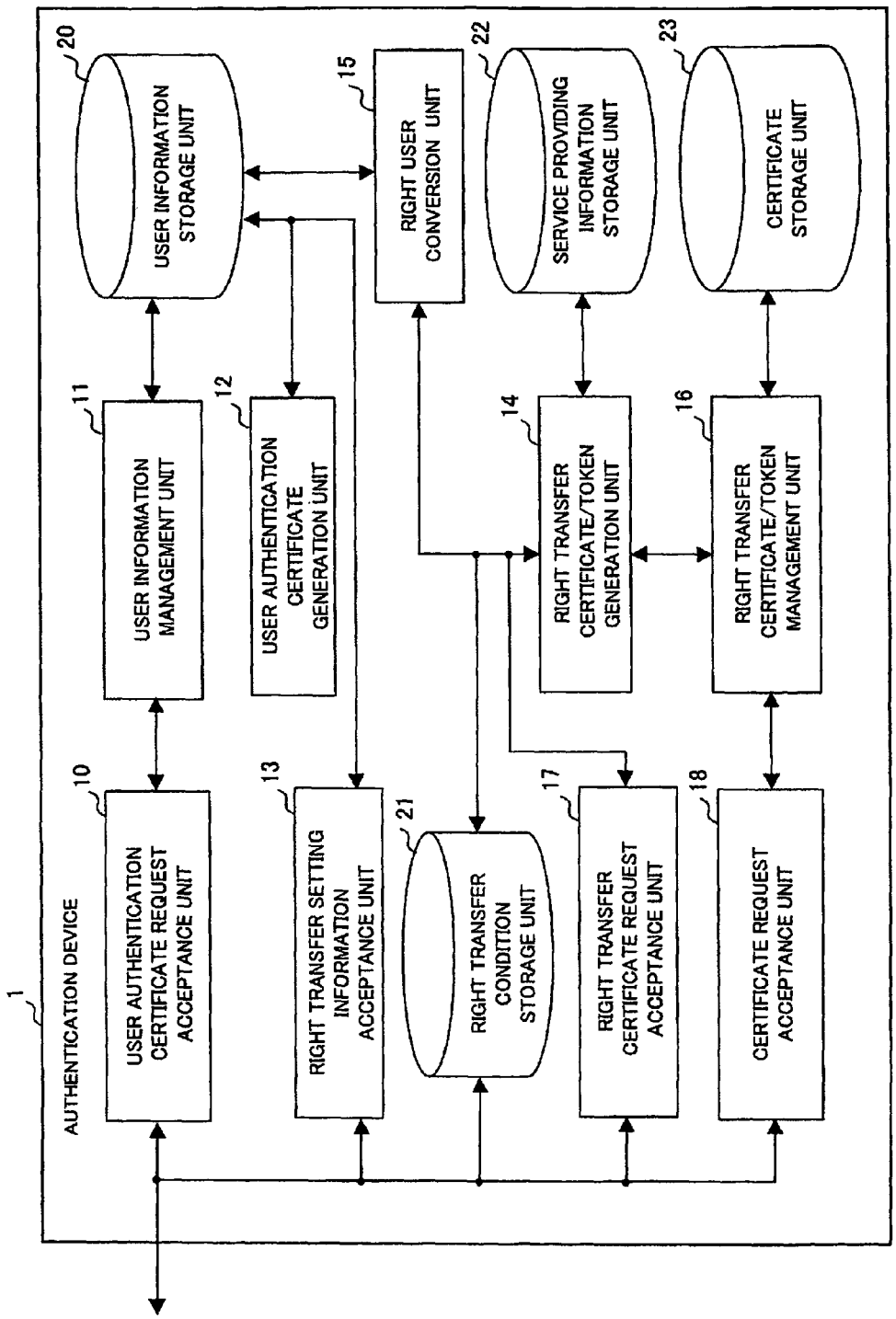

*FIG.4*

```
<Assertion ID="assertion-1234567890" IssueInsatnt="2005-07-01T00:20:02Z"Version="2.0">
  <Issuer> https://authn200.com </isuuer>
  <ds:Signature> signature by authn200 goes here </ds:Signature>
  <Subject>
      <NameID Format= "urn:oasls:mames:tc:SAML:1.1:nameid-format:persistent>
          aabbcc
      </NameID>
  </Subject>
  <Conditions NotBefore="2005-07-01T00:20:02Z"NotOnOrAfter="2005-07-01T00:25:02Z">
    <AudienceRestriction>
        <Audience> http://sp-proxy201.com </Audience>
    </AudienceRestriction>
  </Conditions>
  <AuthnStatement AuthnTnstaint="2005-07-01T00:20:02Z" NotONOrAfter="2005-07-01T00:25:02Z">
      <saml:AuthnContext>
      <saml:AuthnContextClassRef>
            urn:oasis:names:tc:SAML:2.0:ac:classes:PasswordProtectedTreansport
      </saml:AuthnContextClassRef>
      </saml:AuthnContext>
  </AuthnStatement>
</Assertion>
```

FIG.5

| IDENTIFIER OF PERSON WHO SETS TRANSFER OF RIGHT | IDENTIFIER OF USER TO WHOM RIGHT IS TRANSFERRED | ID OF SERVICE TO BE ACCESSED |
|---|---|---|
| aabbcc | UserID_123 | sp-proxy201.com |
|  |  |  |
|  |  |  |

FIG.6

| TOKEN | CERTIFICATE |
|---|---|
| 9df234tr5234rig3485289 | <Assertion> * * * * </Assertion> |
|  |  |
|  |  |

PRIOR ART

ACCESS RIGHT MANAGEMENT SYSTEM, ACCESS RIGHT MANAGEMENT METHOD, AND ACCESS RIGHT MANAGEMENT PROGRAM

TECHNICAL FIELD

The present invention relates to an access right management system, an access right management method and an access right management program that allow the transfer of rights between users to be managed centrally.

BACKGROUND ART

As a technique of coordinating information about users between businesses over networks, there is standard technical specification SAML (Security Assertion Markup Language) standardized by OASIS, a standard-setting organization. FIG. 22 is a configuration diagram illustrating one example of a certificate generation and distribution system that uses SAML as disclosed in NPL 1.

In the certificate generation and distribution system illustrated in FIG. 22, an identity provider (represented by IdP, hereinafter) 100, a service provider (represented by SP, hereinafter) 101 and a user agent (which is software on a user's terminal device) 102 are connected together through a network. The following describes a procedure of generating and distributing a certificate by means of the SAML artifact profile as an exemplary operation of the certificate generation and distribution system having the above configuration. In the example illustrated in FIG. 22, suppose that IdP100 and SP101 retain user information 103 and 104, respectively, in storage devices as information about a user who uses the user agent 102.

In the certificate generation and distribution system illustrated in FIG. 22, the user accesses SP101 through the user agent 102 to use a service whose use is restricted by SP101 (Step (1) in FIG. 22). SP101 transmits a certificate request message to IdP100 to acquire a certificate of the user (Step (2-*a*) in FIG. 22); the user agent 102 redirects the certificate request message from SP101 to IdP100 (Step (2-*b*) in FIG. 22). IdP100 uses the user information 103 to produce a certificate (assertion) written in XML (Extensible Markup Language) (Step (3) in FIG. 22). Moreover, IdP100 produces an artifact that serves as a ticket corresponding to the assertion and transmits the artifact back to the user agent 102 (Step (4-*a*) in FIG. 22). The user agent 102 redirects the artifact to SP101 (Step (4-*b*) in FIG. 22).

SP101 transmits the received artifact to IdP100 and requests the corresponding assertion (Step (5) in FIG. 22). IdP100 confirms the artifact received from SP101 and returns the corresponding assertion to SP101 (Step (6) in FIG. 22). SP101 checks the validity of the assertion received from IdP100, examines a security policy of SP101, and makes a determination as to whether to allow the request from the user for accessing the service. When it is determined that the request is allowed, the service starts to be provided to the user agent 102 (Step (7) in FIG. 22).

As described above, IdP100 generates the certificate concerning the user and distributes the certificate to SP101. It is possible to record information about the user who accesses SP101 in the certificate distributed by IdP100. The information about the user may be user identifier information, information about a service area of the certificate (or about businesses who accept the certificate after distribution), classified information about the user, or other kinds of information.

Disclosed in PTL 1 is an example of a system for managing the transfer of access rights. FIG. 23 is an explanatory diagram illustrating an access management system that realizes the transfer of rights as disclosed in PTL 1. What is described in the example illustrated in FIG. 23 is a system that manages the transfer of rights between a member of an organization A (110) and a member of an organization B (111). In a given organization A, a resource 113 is controlled. In another organization B, a resource 113 is controlled. In the organization B, there is a resource access person 115 who accesses the resource 113.

The following describes the operation of the access management system illustrated in FIG. 23. First an administrator 112 of the organization A transmits credit information to an administrator 114 of the organization B (Step (1) in FIG. 23). What are described in the credit information are conditions (or conditions for the transfer of rights) under which, instead of the administrator of the organization A, the resource access person 115 of the organization B accesses the resource. The following description is based on the assumption that the resource access person 115 satisfies the conditions for accessing the resource. Then, the administrator 114 of the organization B issues credit information to the resource access 115 of the organization B on behalf of the administrator 112 of the organization A (Step (2) in FIG. 23). The credit information issued by the administrator 114 of the organization B includes the credit information issued by the administrator 112 of the organization A. The resource access person 115 of the organization B then transmits, along with the credit information issued by the administrator 114 of the organization B, an access request message to the resource 113 of the organization A (Step (3) in FIG. 23). The resource 113 of the organization A makes a determination as to whether to allow access on the basis of the credit information transmitted from the resource access person 115 of the organization B and transmits some information to the resource access person 115 of the organization B.

As described above, the administrator 112 of the organization A transmits the information for proxy access to the organization B, a counterpart to which the access right is transferred. Therefore, the transfer of the access right is realized.

CITATION LIST

Patent Literature

{PTL 1} JP-A-2006-254464
{NPL 1} OASIS, "Assertions and Protocol for the OASIS Security Assertion Markup Language (SAML)V2.0," [online], Mar. 15, 2005, (searched on Nov. 26, 2007), Internet, <URL: http://docs.oasis-open.org/security/saml/v2.0/saml-core-2.0-os.pdf>

SUMMARY OF INVENTION

Technical Problem

However, there are the following problems with the techniques disclosed in the above PTL 1 and NPL 1.

The first problem is that, with the techniques disclosed in the above PTL 1 and NPL 1, the probability is high that information may leak when a user (user 1) uses an access right transferred from another user (user 2) to make a service provider (SP1) act as a proxy in accessing another service provider (SP2). The reason is that all the user information and access rights that the service provider has need to be exchanged between the provider (SP1) that acts as a proxy in accessing the provider (SP2) and the service provider (SP2) that is to be accessed.

That is, according to the techniques disclosed in PTL 1 and NPL 1, SP1 and SP2 exchange with each other the certificate in which the access right information of both users 1 and 2 is recorded. Therefore, there is a high possibility that information may leak. According to the technique disclosed in PTL 1, the credit information in which all the access right information is recorded is exchanged between the service providers. That is, the two service providers exchange with each other all information about the user including access rights and settings of right transfer. Even with the technique disclosed in NPL 1, the providers exchange with each other the certificate in which information about the user is recorded. As a result, all information about the user is disclosed to the other providers.

When a user (user 1) uses an access right transferred from another user (user 2) to make a service provider (SP1) act as a proxy in accessing another service provider (SP2), SP1 has accepted access from the user 1. Therefore, information about the user 2 is unnecessary. Moreover, since SP2 has accepted proxy access with the user 2's right, only the right information of the user 2 is necessary and information about the user 1 is unnecessary. Thus, it is not necessary for SP1 and SP2 to acquire user information of both users. That is, it is desirable for each service provider to use only essential user information.

The second problem is that when a user (user 1) uses an access right transferred from another user (user 2) to make a service provider (SP1) act as a proxy in accessing another service provider (SP2), the user 2 needs to specify, as a policy, the settings of access right and right transfer for all providers. Therefore, the procedure is not efficient.

The reason is that the providers each separately manage information that is used to determine whether to allow access. The service providers each manage the user's access acceptance/rejection information. Accordingly, when a user transfers the right to another user, it is necessary to set transfer conditions for all the providers involved. According to the technique disclosed in NPL 1, the service provider controls access after receiving and examining the certificate. Therefore, when the user sets up the right transfer, the user needs to set up the right transfer for all SPs. Even with the technique disclosed in PTL 1, the administrator of the organization A who controls access issues the credit information as access control information. That is, for each of the resources or service providers to be accessed, the settings of right transfer of the user need to be kept. The above methods are inefficient because the number of times the access right and the right transfer are set increases as the number of resources and the number of service providers working closely with each other increase.

The object of the present invention is to provide an access right management system, an access right management method and an access right management program that can reduce the amount of information exchanged between devices when a device uses a right transferred from a user to act as a proxy in accessing another device.

Another object of the present invention is to provide an access right management system, an access right management method and an access right management program that allow the settings of access control and right transfer to be managed centrally at one site.

Solution to Problem

According to the present invention, an access right management system is characterized by including an authentication device that manages a condition under which a right is transferred, a service providing device that provides a service in response to a service request, and a service proxy access device that acts as a proxy in accessing the service providing device, wherein: the authentication device includes a user authentication certificate generation unit that issues to another device user authentication information on which information about a user is recorded and a right transfer certificate/token generation unit that issues to another device right transfer information and a token corresponding to the right transfer information on the basis of information about a user to whom the right is transferred and the condition under which the right is transferred; the service proxy access device includes a token request unit that requests the issuing of the right transfer information and the token in order to access another device and a user proxy access unit that accesses another service using the token; and the service providing device includes a user authentication certificate request unit that uses the token to acquire the user authentication information from the authentication device.

According to the present invention, an authentication device that issues user authentication information in an access right management system managing the transfer of a right is characterized by including: a user authentication certificate generation unit that generates, for another device, user authentication information on which information about a user is recorded; a right transfer setting information acceptance unit that sets a condition under which an access right is transferred to another user; a right transfer condition storage unit that stores the condition under which the access right is transferred that is set by a user; a right transfer certificate/token generation unit that issues to another device right transfer information and a token corresponding to the right transfer information on the basis of information about a user to whom the right is transferred and the condition under which the right is transferred; a certificate storage unit that keeps the right transfer information and token issued by the right transfer certificate/token generation unit; and a certificate request acceptance unit that receives the token and acquires from the certificate storage unit the right transfer information corresponding to the token received.

According to the present invention, a service proxy access device that acts as a proxy in accessing a service providing device in an access right management system managing the transfer of a right is characterized by including: a user authentication certificate management unit that acquires user authentication information of a user who is accessing; a user authentication certificate storage unit that keeps the user authentication information acquired; a token request unit that requests the issuing of right transfer information and a token in order to access another device; and a user proxy access unit that accesses another service using the token.

According to the present invention, a service providing device that provides a service in response to a service request in an access right management system managing the transfer of a right is characterized by including: a token acceptance unit that receives from another device a token that is used to acquire information about a user; a user authentication certificate request unit that acquires user authentication information using the token received; a service access acceptance unit that makes a determination as to whether to allow access to service information by examining the information about the user; and a service information storage unit that keeps a service to be provided to another device.

According to the present invention, an access right management method, which is for enabling an authentication device that manages a right transfer condition and issues user authentication information to generate and distribute information about the transfer of a right and a token to a service providing device that provides a service in response to a service request and a service proxy access device that acts as a proxy in accessing the service providing device, is characterized in that: the authentication device performs a user authentication certificate generation step of generating, for another device, user authentication information on which information about a user is recorded and a right transfer certificate/token generation step of issuing to another device right transfer information and a token corresponding to the right transfer information on the basis of information about a user to whom the right is transferred and a condition under which the right is transferred; the service proxy access device performs a token request step of requesting the issuing of the right transfer information and the token in order to access another device and a user proxy access step of accessing another service using the token; and the service providing device performs a user authentication certificate request step of using the token to acquire the user authentication information from the authentication device.

According to the present invention, an authentication program, which is in an authentication device issuing user authentication information in an access right management system managing the transfer of a right, is characterized by causing a computer to function as the authentication device including: a user authentication certificate generation unit that generates, for another device, user authentication information on which information about a user is recorded; a right transfer setting information acceptance unit that sets a condition under which an access right is transferred to another user; a right transfer condition storage unit that stores the condition under which the access right is transferred that is set by a user; a right transfer certificate/token generation unit that issues to another device right transfer information and a token corresponding to the right transfer information on the basis of information about a user to whom the right is transferred and the condition under which the right is transferred; a certificate storage unit that keeps the right transfer information and token issued by the right transfer certificate/token generation unit; and a certificate request acceptance unit that receives the token and acquires from the certificate storage unit the right transfer information corresponding to the token received.

According to the present invention, a service proxy access program, which is in a service proxy access device acting as a proxy in accessing a service providing device in an access right management system managing the transfer of a right, is characterized by causing a computer to function as the service proxy access device including: a user authentication certificate management unit that acquires user authentication information of a user who is accessing; a user authentication certificate storage unit that keeps the user authentication information acquired; a token request unit that requests the issuing of right transfer information and a token in order to access another device; and a user proxy access unit that accesses another service using the token.

According to the present invention, a service providing program, which is in a service providing device providing a service in response to a service request in an access right management system managing the transfer of a right, is characterized by causing a computer to function as the service providing device including: a token acceptance unit that receives from another device a token that is used to acquire information about a user; a user authentication certificate request unit that acquires user authentication information using the token received; a service access acceptance unit that makes a determination as to whether to allow access to service information by examining the information about the user; and a service information storage unit that keeps a service to be provided to another device.

Advantageous Effects of Invention

According to the present invention, it is possible to control access and to transfer rights while protecting security and privacy.

BRIEF DESCRIPTION OF DRAWINGS

{FIG. 3} A block diagram illustrating an example of the configuration of an authentication device according to a first exemplary embodiment of the present invention.

{FIG. 4} A diagram illustrating an example of a user authentication certificate issued by the authentication device according to the first exemplary embodiment.

{FIG. 5} An explanatory diagram illustrating a correlation between right transfer conditions, which area given person who sets the transfer of a right, a user to whom the right is transferred, and the ID of a service to be accessed, according to the first exemplary embodiment.

{FIG. 6} An explanatory diagram illustrating a correlation between token and certificate according to the first exemplary embodiment.

REFERENCE SIGNS LIST

Figure 1:
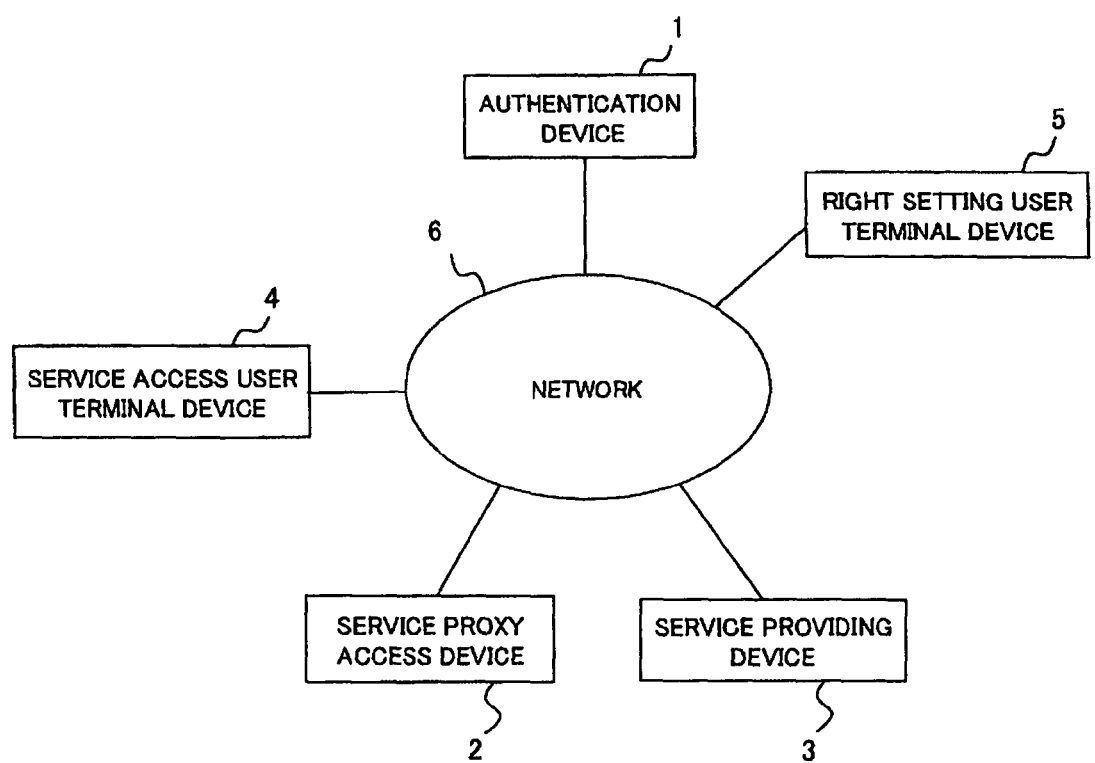
{FIG. 1} A block diagram illustrating the basic configuration of an access right management system as a whole according to the present invention.

1: Authentication device
2: Service proxy access device
3: Service providing device
4: Service access user terminal device
5: Right setting user terminal device
6: Network
7: Service providing device
10: User authentication certificate request acceptance unit
11: User information management unit
12: User authentication certificate generation unit
13: Right transfer setting information acceptance unit
14: Right transfer certificate/token generation unit
15: Right user conversion unit
16: Right transfer certificate/token management unit
17: Right transfer certificate request acceptance unit
18: Certificate request acceptance unit
20: User information storage unit
21: Right transfer condition storage unit
22: Service providing information storage unit
23: Certificate storage unit
31: User authentication certificate request unit
32: User proxy access unit
33: Access right token request unit
34: User certificate management unit
35: User certificate examination unit
36: Access right token management unit
41: User authentication certificate storage unit
42: Proxy access information storage unit
43: Access right token storage unit
50: Service access acceptance unit
51: Service information management unit
52: Access right token acceptance unit
53: User authentication certificate request unit
54: Certificate examination unit
60: Service information storage unit
61: Access right condition storage unit
62: Certificate information storage unit
71: Service proxy access unit
100: Identity provider (IdP)
101: Service provider (SP)
102: User agent
103: User information
104: User information
110: Organization A
111: Organization B
112: Administrator of organization A
113: Resource
114: Administrator of organization B
115: Resource access person of organization B
200: Authentication device
201: Shopping site
202: Shipping company
203: Product purchaser
204: Product delivery user
205: Authentication device
206: User terminal device
207: Service provider
208: Charging service
209: Company's expense bearing department
A: Authentication device
B: Service proxy access device
C: Service providing device
D: Authentication program
E: Service proxy access program
F: Service providing program
G: Network

DESCRIPTION OF EMBODIMENTS

The following describes in detail exemplary embodiments of the present invention with reference to the accompanying drawings.

FIG. 1 is a block diagram illustrating the overall configuration of an access right management system according to an exemplary embodiment of the present invention. According to a first exemplary embodiment of the present invention, the access right management system includes an authentication device 1, a service proxy access device 2, a service providing device 3, a service access user terminal device 4, and a right setting user terminal device 5. The above devices are each connected to a network 6. What are shown in FIG. 1 are one authentication device 1, one service proxy access device 2, one service providing device 3, one service access user terminal device 4, and one right setting user terminal device 5. However, what are shown in FIG. 1 are one example; there may be one or more authentication devices 1, one or more service proxy access devices 2, one or more service providing devices 3, one or more service access user terminal devices 4, and one or more right setting user terminal devices 5.

A user who transfers a right to another user accesses the authentication device 1 through the right setting user terminal device 5. A user to whom the right is transferred from another user accesses the service proxy access device 2 through the service access user terminal device 4. Incidentally, the user means an individual or an organization made up of a plurality of individuals.

Figure 2:
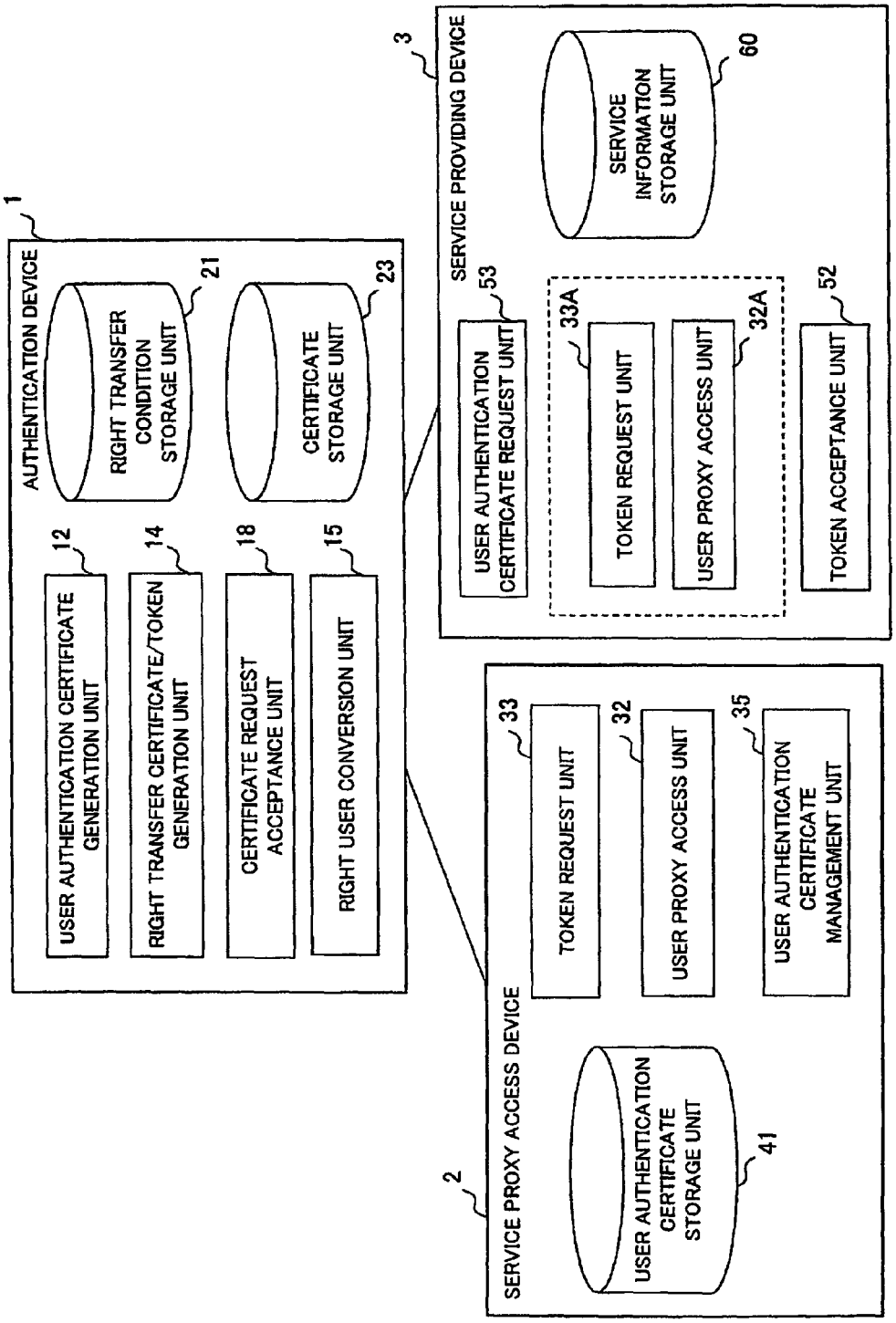
{FIG. 2} A block diagram illustrating the configuration of the access right management system according to the present invention.

FIG. 2 is a block diagram illustrating the major components of the access right management system according to the present invention. As shown in FIG. 2, the access right management system includes the authentication device 1 that manages conditions under which the right is transferred; the service providing device 3 that provides a service in response to a service request; and the service proxy access device 2 that acts as a proxy in accessing the service providing device. The authentication device 1 includes a user authentication certificate generation unit 12 and a right transfer certificate/token generation unit 14. The user authentication certificate generation unit 12 issues, to another device, user authentication information in which information about the user is recorded. The right transfer certificate/token generation unit 14 issues, to another device, right transfer information and a token corresponding to the right transfer information on the basis of the information about the user to whom the right is transferred and of the right transfer conditions. The service proxy access device 2 includes a token request unit 33 and a user proxy access unit 32. The token request unit 33 requests the right transfer information and the token to be issued in order to access another device. The user proxy access unit 32 uses the token to access another service. The service providing device 3 includes a user authentication certificate request unit 53 that uses the token to acquire the user authentication information from the authentication device.

The service providing device 3 also includes a service information storage unit 60 in which a service that is to be provided to another device is kept; and a token acceptance unit 52 that receives the token which is used to acquire information about the user from another device.

Incidentally, the user authentication information (which is, for example, a user authentication certificate) that the user authentication certificate request unit 53 acquires is called the right transfer information (which is, for example, a right transfer certificate) in the authentication device 1. Since there is right transfer setting information in the authentication device 1, the user authentication information is judged to be the right transfer information. However, in the service providing device 3, the user authentication information is information about the user and there is no information about the transfer of the right. Since the service providing device 3 cannot determine whether the user authentication information is the right transfer information, the user authentication information is regarded as the user authentication information. Both indicate the same information. However, since each device has a different kind of information as a premise, the information is called differently.

The configuration of each device of the present exemplary embodiment may change as described below. Incidentally, the present invention is not limited to the exemplary embodiments and examples disclosed herein. It is clear that various modifications apparent to those skilled in the art can be made in the configuration and details of the present invention without departing from the scope of the invention.

The authentication device 1 may include a right transfer condition storage unit 21 that stores a condition under which an access right is transferred, with the condition set up by a user who transfers the right; the right transfer certificate/token generation unit 14 may issue the right transfer information and the token corresponding to the right transfer information on the basis of the right transfer condition stored in the right transfer condition storage unit 21. The authentication device 1 may include a certificate storage unit 23 in which the right transfer information issued by the right transfer certificate/token generation unit 14 and the token corresponding to the right transfer information are kept; and a certificate request acceptance unit 18 that receives a token and then acquires from the certificate storage unit the right transfer information corresponding to the received token. The authentication device 1 may include a right user conversion unit 15 that makes a determination as to whether to allow the transfer of the access right to another user; the right transfer certificate/token generation unit 14 may issue the right transfer information and the token corresponding to the right transfer information when the right user conversion unit 15 determines to allow the transfer of the right.

The service proxy access device 2 may include a user authentication certificate management unit 35 that acquires the user authentication information of the user who is accessing; and a user authentication certificate storage unit 41 in which the acquired user authentication information is kept.

The service providing device 3 may further include a token request unit 33A that requests the right transfer information and the token to be issued in order to act as a proxy for the user recorded in the user authentication information in accessing another device; and a user proxy access unit 32A that uses the token for another device to access another service.

First Exemplary Embodiment

The following describes the first exemplary embodiment of the present invention. The overall configuration of an access right management system is shown in FIG. 1.

FIG. 3 is a block diagram illustrating an example of the configuration of an authentication device 1. In the example illustrated in FIG. 3, the authentication device 1 includes a user authentication certificate request acceptance unit 10, a user information management unit 11, a user authentication certificate generation unit 12, a right transfer setting information acceptance unit 13, a right transfer certificate/token generation unit 14, a right user conversion unit 15, a right transfer certificate/token management unit 16, a right transfer certificate request acceptance unit 17, a certificate request acceptance unit 18, a user information storage unit 20, a right transfer condition storage unit 21, a service providing information storage unit 22, and a certificate storage unit 23.

The user authentication certificate request acceptance unit 10 accepts a request from another device for a user authentication certificate and returns the user authentication certificate issued by the user authentication certificate generation unit 12 to the device that has made the request for the user authentication certificate. The user authentication certificate is a document on which the information about the user stored (kept) in the user information storage unit 20 is recorded. The user authentication certificate includes user identifier information, certificate issuer information and the like. An example of the user authentication certificate is shown in FIG. 4. For example, the user authentication certificate is in the format of SAML, which is disclosed in NPL 1, or X.509. However, the user authentication certificate is not limited to such a format. According to the present invention, the user authentication certificate can be in any format as long as the user authentication certificate includes information about the user.

The user information management unit 11 acquires from the user information storage unit 20 user information which is a source of the certificate when the user authentication certificate request acceptance unit 10 receives a request for generating the user authentication certificate; and transmits the user information to the user authentication certificate generation unit 12. The user authentication certificate generation unit 12 issues the user authentication certificate on the basis of the information of the user information storage unit 20.

The right transfer setting information acceptance unit 13 accepts right transfer setting information from the right setting user terminal device 5 illustrated in FIG. 1. The right transfer setting information acceptance unit 13 then stores the right transfer setting information in the right transfer condition storage unit 21 along with the information stored in the user information storage unit 20. The right transfer setting information is information including an identifier of the user who transfers the right, an identifier of the user to whom the right is transferred, the ID of an provider that is to be accessed with the transferred right, URLs, resources and the like. Incidentally, FIG. 5 shows an example of information stored in the transfer condition storage unit 21.

The right transfer certificate/token generation unit 14 acquires from the right transfer certificate request acceptance unit 17 a request for issuing the right transfer certificate that is used for proxy access as well as acquires from the right user conversion unit 15 information about the user to whom the right is transferred; and issues the right transfer certificate. The right transfer certificate is in the same format as the user authentication certificate's. When seen from the authentication device 1 that issues the right transfer certificate, the certificate is a certificate issued based on the right transfer setting information; the certificate is therefore a right transfer certificate. However, there is no right transfer setting information in the service providing device 3 that receives the right transfer certificate; when seen from the service providing device 3, the certificate is a mere user authentication certificate since the information about the user is recorded therein.

Furthermore, the right transfer certificate/token generation unit 14 issues a token that is used to uniquely identify a certificate. The token has an identifier recorded thereon to identify the certificate. The token that is used to uniquely identify the certificate can be realized by using the artifact defined in SAML as disclosed in NPL 1. However, the token may be in any form other than the artifact as long as the token is a string of characters uniquely linked to the certificate.

The right user conversion unit 15 acquires the user authentication certificate from the right transfer certificate request acceptance unit 17; and makes a determination as to whether to allow the transfer of the right on the basis of the conditions recorded in the right transfer condition storage unit 21. When the right user conversion unit 15 determines to allow the transfer of the right, the right user conversion unit 15 acquires from the user information storage unit 20 the user information of the user to whom the right is transferred. For example, when the identifier of the user recorded on the user authentication certificate is recorded as the identifier of a user to whom the right is transferred that is stored in the right transfer condition storage unit 21, the right user conversion unit 15 determines to allow the transfer of the right. The right user conversion unit 15 also allows the issuing of the user authentication certificate (right transfer certificate) as a user who transfers the right.

The right transfer certificate/token management unit 16 registers the certificate and token generated by the right transfer certificate/token generation unit 14 in the certificate storage unit 23 in such a way that the certificate and the token are associated with one another. The right transfer certificate/token management unit 16 also acquires the certificate from the certificate storage unit 23 by using the token. The right transfer certificate request acceptance unit 17 acquires from another device a request for issuing the right certificate that is used for proxy access and the user authentication certificate. The right transfer certificate request acceptance unit 17 then returns the token pertaining to the access right produced by the authentication device 1 to the device that has acquired the request for issuing the right certificate.

The certificate request acceptance unit 18 acquires the token from another device and returns the certificate stored in the certificate storage unit 23.

The user information storage unit 20 stores the user information. The user information includes the user identifier, information about the access right of the user (Read, Write, right of execution and the like), information about whether to issue the certificate to another device, and the like. Incidentally, the information concerning the user is not limited to the kinds of information described above. In addition to or instead of the kinds of information described above, other information may be added.

The right transfer condition storage unit 21 stores the user's right transfer information including the identifier of the user who transfers the right, the identifier of the user to whom the right is transferred, information about the device to be accessed, to-be-accessed information, and the like. The service providing information storage unit 22 stores information such as a to-be-accessed URL of the service providing device 3 as illustrated in FIG. 1.

The certificate storage unit 23 stores the certificate and the token in such a way that the certificate and the token are associated with one another. FIG. 6 shows an example of information stored in the certificate storage unit 23. In the example illustrated in FIG. 6, the certificate is stored with the token serving as a key.

Figure 7:
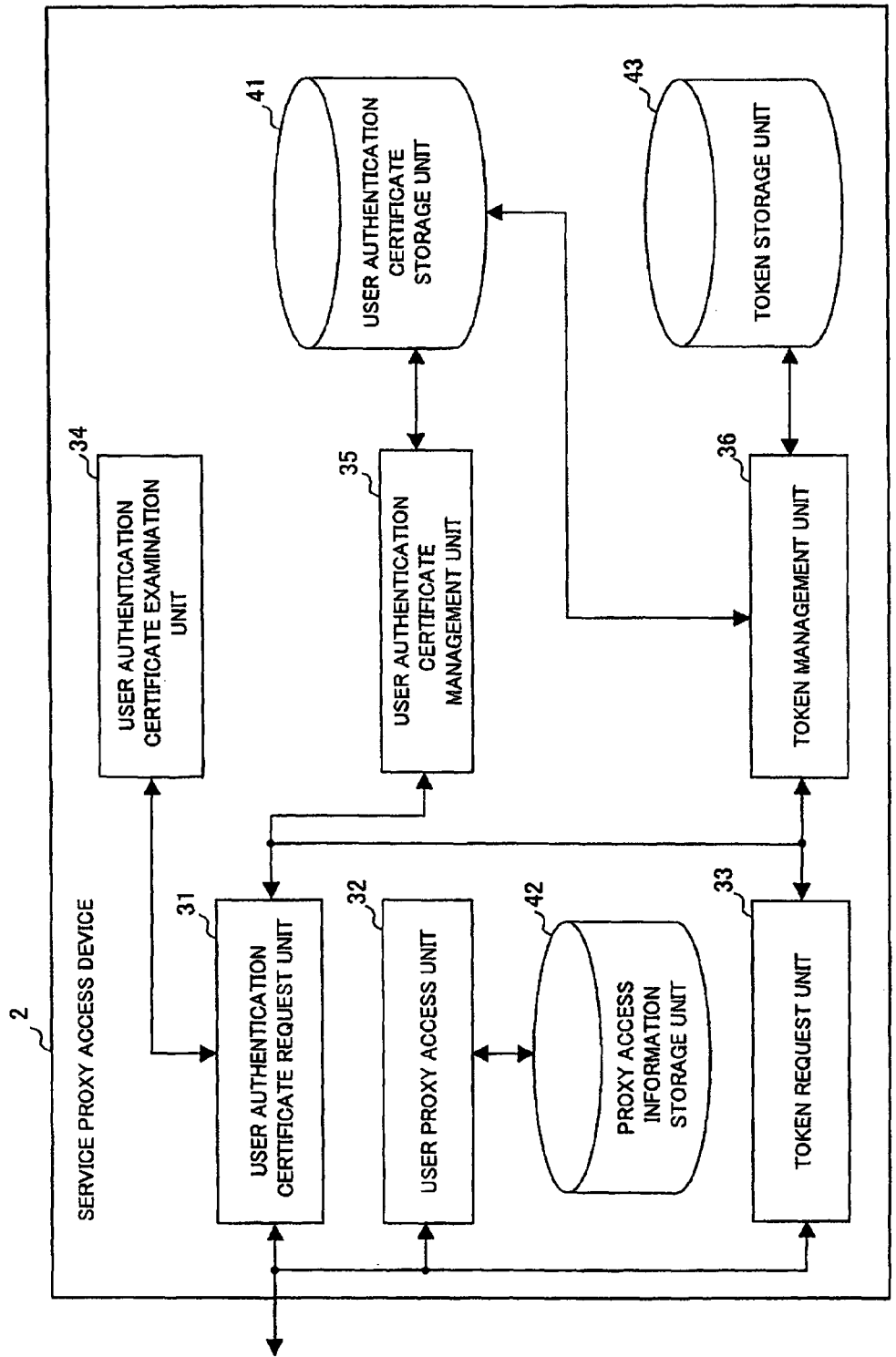
{FIG. 7} A block diagram illustrating the configuration of a service proxy access device according to the first exemplary embodiment.

FIG. 7 is a block diagram illustrating an example of the configuration of the service proxy access device 2. As shown in FIG. 7, the service proxy access device 2 includes a user authentication certificate request unit 31, a user proxy access unit 32, a token request unit 33, a user authentication certificate examination unit 34, a user authentication certificate management unit 35, a token management unit 36, a user authentication certificate storage unit 41, a proxy access information storage unit 42, and a token storage unit 43.

The user authentication certificate request unit 31 requests the user authentication certificate from the authentication device 1 to acquire the user authentication certificate.

The user proxy access unit 32 checks the access right stored in the proxy access information storage unit 42. When proxy access is possible, the user proxy access unit 32 acts as a proxy for the user and accesses another device by using the token pertaining to the access right acquired from the authentication device 1.

The token request unit 33 uses the user authentication certificate to request the authentication device 1 to issue the right transfer certificate and acquires the token.

The user authentication certificate examination unit 34 examines whether the user authentication certificate acquired from the authentication device 1 is correct. Examining whether the user authentication certificate is correct means confirming whether there is any violation in the certificate by checking the period of validity of the certificate, the format of the certificate, the issuer of the certificate and the like.

The user authentication certificate management unit 35 registers the user authentication certificate in the user authentication certificate storage unit 41. The user authentication certificate management unit 35 also acquires the authentication certificate of the user who is accessing. The token management unit 36 stores in the token storage unit 43 the token acquired from the authentication device 1. The user authentication certificate storage unit 41 stores the user authentication certificate. The proxy access information storage unit 42 stores the access right information indicating whether the device is able to act as a proxy for the user in accessing another device.

Figure 8:
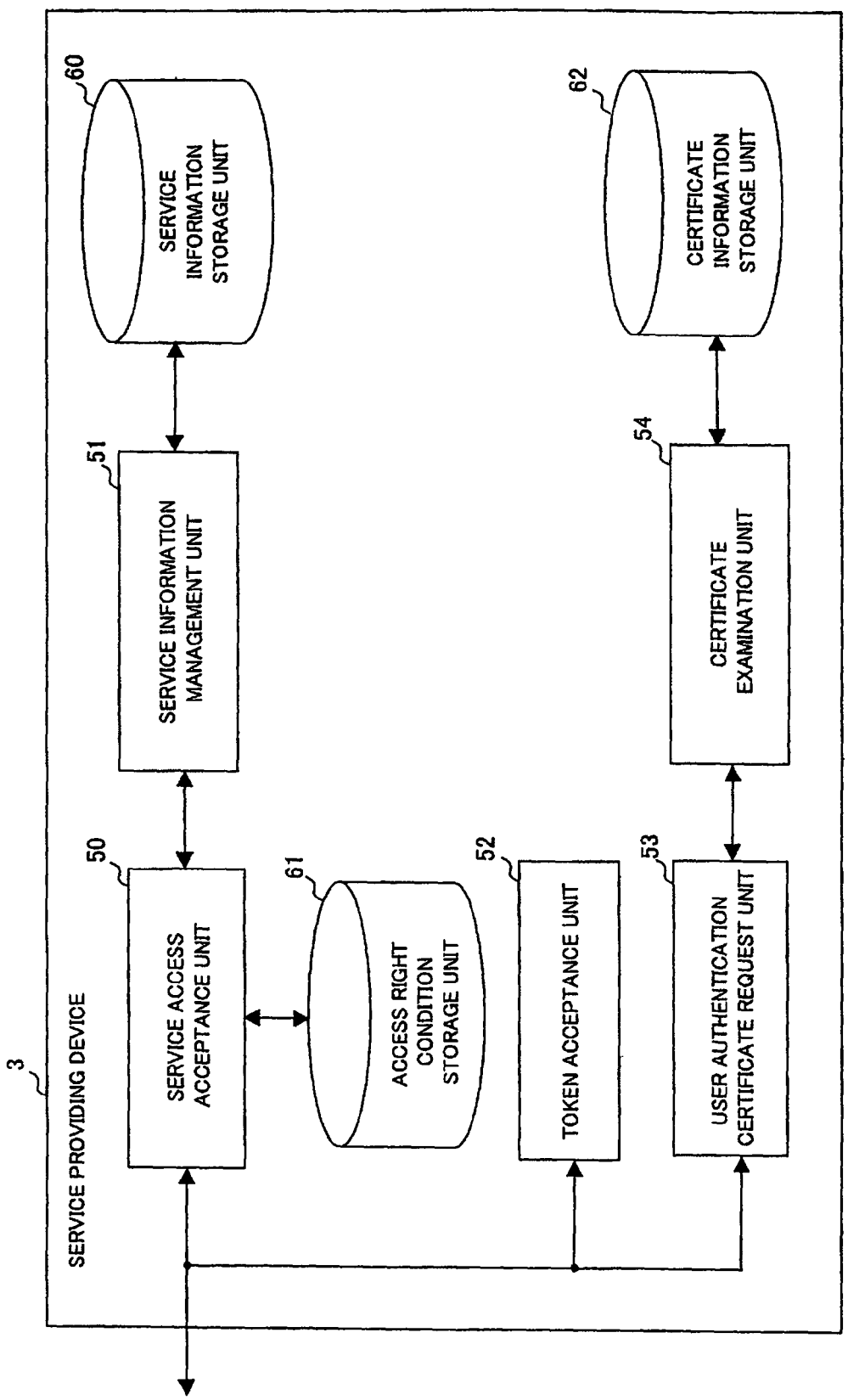
{FIG. 8} A block diagram illustrating the configuration of a service providing device according to the first exemplary embodiment.

FIG. 8 is a block diagram illustrating an example of the configuration of the service providing device 3. As shown in FIG. 8, the service providing device 3 includes a service access acceptance unit 50, a service information management unit 51, a token acceptance unit 52, a user authentication certificate request unit 53, a certificate examination unit 54, a service information storage unit 60, an access right condition storage unit 61, and a certificate information storage unit 62.

The service access acceptance unit 50 acquires a request for a service from anther device. When the service request satisfies the access conditions stored in the access right condition storage unit 61, the service access acceptance unit 50 transmits information about the service.

The service information management unit 51 acquires the information about the service from the service information storage unit 60. The token acceptance unit 52 acquires the token from a service request message when the service request is acquired during proxy access. The user authentication certificate request unit 53 transmits to the authentication device 1 the token acquired from the token acceptance unit 52; and acquires the user authentication certificate.

The certificate examination unit 54 analyzes the token acquired by the user authentication certificate request unit 53 to confirm whether the certificate is correct. The service information storage unit 60 stores information about the service that the service providing device 3 provides to another device. The access right condition storage unit 61 stores conditions under which the service is provided. The certificate information storage unit 62 stores the authentication certificate pertaining to the user.

The following describes the operation of the first exemplary embodiment with reference to FIGS. 9 to 16.

Figure 9:
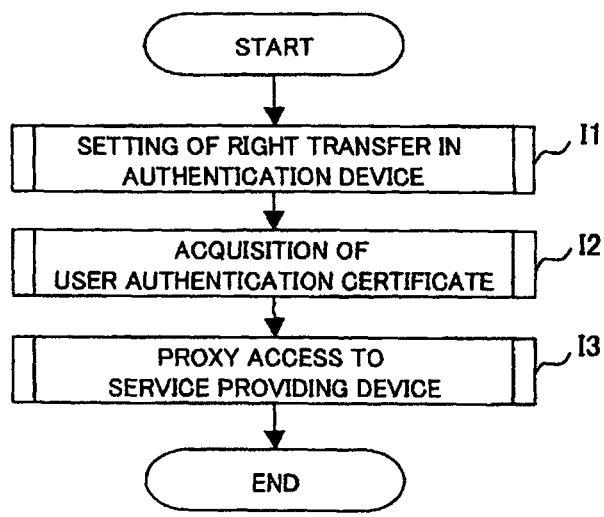
{FIG. 9} A flowchart outlining a process of the first exemplary embodiment.

With reference to FIG. 9, the operation of the system as a whole will be described. The right setting user terminal device 5 accesses the authentication device 1 and sets the right transfer conditions (Step I1). At this time, if the right transfer conditions have been already set in the authentication device 1, the process of step I1 can be omitted. The process of step I1 will be detailed later with reference to FIG. 10. Subsequently, the service access user terminal device 4 accesses the service proxy access device 2. The service proxy access device 2 acquires the user authentication certificate from the authentication device 1 (Step I2). The process of step I2 will be detailed later with reference to FIG. 11. The service proxy access device 2 then uses the user's right to act as a proxy in accessing the service providing device 3 (Step I3). The process of step I3 will be detailed later with reference to FIG. 13.

Figure 10:
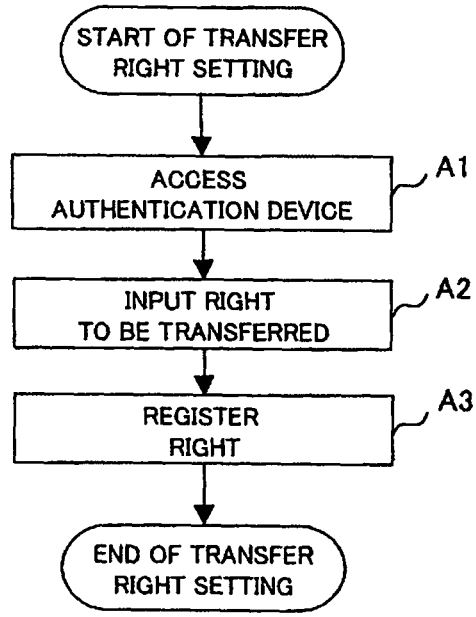
{FIG. 10} A flowchart illustrating a process concerning the authentication device when a user sets the transfer of a right to another user, according to the first exemplary embodiment.

The following describes a setting operation for enabling a user (user A) to transfer the access right to anther user (user B) with reference to FIG. 10. FIG. 10 is a flowchart illustrating a process concerning the authentication device 1 when a user sets the transfer of the right to another user.

The user A accesses the right transfer setting information acceptance unit 13 of the authentication device 1 through the right setting user terminal device 5 (Step A1). Then, the user A who transfers the right inputs a condition under which the access right of the user A managed by the user information storage unit 20 is transferred to another user (Step A2). The input right is then registered in the right transfer condition storage unit 21 (Step A3). The process described above sets up the condition to realize the transfer of the right. The user A notifies the user B of information about the transfer of the right set by the user A. The notification may take place through the network or offline.

Figure 11:
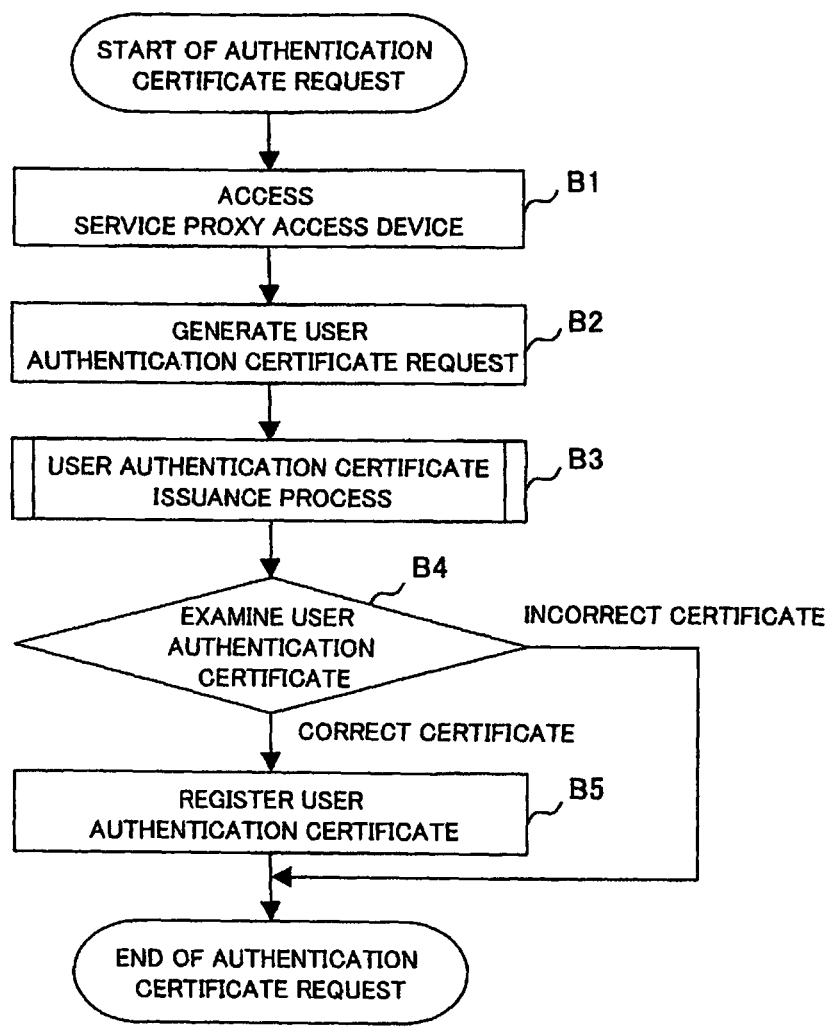
{FIG. 11} A flowchart illustrating a process concerning the service proxy access device when a user authentication certificate is requested and acquired, according to the first exemplary embodiment.

The following describes an operation of the service proxy access device 2 acquiring the user authentication certificate from the authentication device 1 when the service access user terminal device 4 accesses the service proxy access device 2, with reference to FIG. 11. FIG. 11 is a flowchart illustrating a process concerning the service proxy access device 2 when the user authentication certificate is requested and acquired.

First, the user B to whom the right is transferred accesses the user authentication certificate request unit 31 of the service proxy access device 2 through the service access user terminal device 4 (Step B1). The user authentication certificate request unit 31 generates a request message to request the user authentication certificate and transmits the request message to the authentication device 1 (Step B2). The authentication device 1 that has received the request message issues the user authentication certificate and transmits the user authentication certificate to the service proxy access device 2 (Step B3). The process of step B3 will be detailed later with reference to FIG. 12. After acquiring the user authentication certificate from the authentication device 1, the user authentication certificate examination unit 34 examines whether the user authentication certificate is issued correctly (Step B4). When it is determined as a result of the examination process at step B4 that the certificate is not correct, the process ends. When it is determined as a result of the examination at step B4 that the certificate is correct, the user authentication certificate management unit 35 registers the certificate in the user authentication certificate storage unit 41 and ends the process (Step B5).

Figure 12:
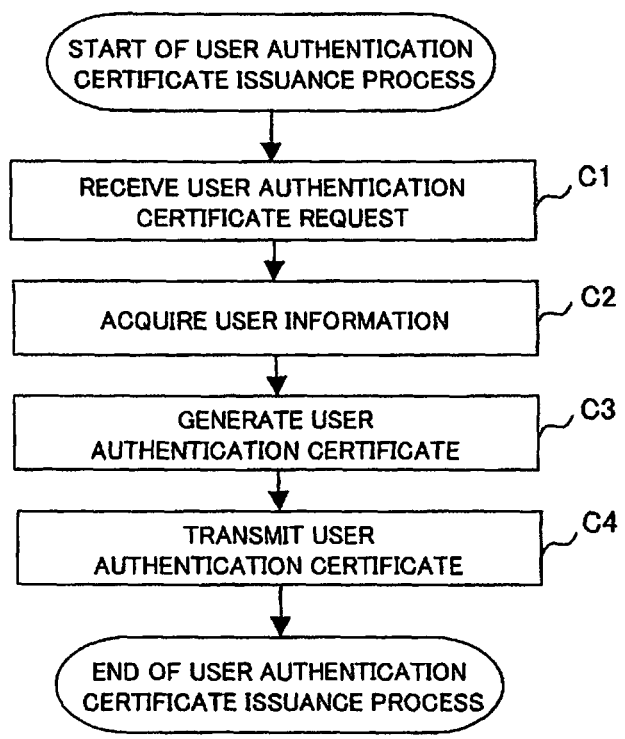
{FIG. 12} A flowchart illustrating a process concerning the authentication device when a user authentication certificate is generated, according to the first exemplary embodiment.

The following describes an operation of a process (Step B3 in FIG. 11) of the authentication device 1 issuing the user authentication certificate, with reference to FIG. 12. FIG. 12 is a flowchart illustrating a process concerning the authentication device when the user authentication certificate is generated.

First the authentication device 1 receives a certificate request from another device through the user authentication certificate request acceptance unit 10 (Step C1). Then, the user information management unit 11 acquires from the user information storage unit 20 the user information that is to be recorded on the certificate (Step C2). Furthermore, the user authentication certificate generation unit 12 issues the user authentication certificate on the basis of the certificate request received from another device and the user information acquired from the user information storage unit 20 (Step C3). The user authentication certificate request acceptance unit 10 then transmits the user authentication certificate to the device that has requested the user authentication certificate (Step C4).

Figure 13:
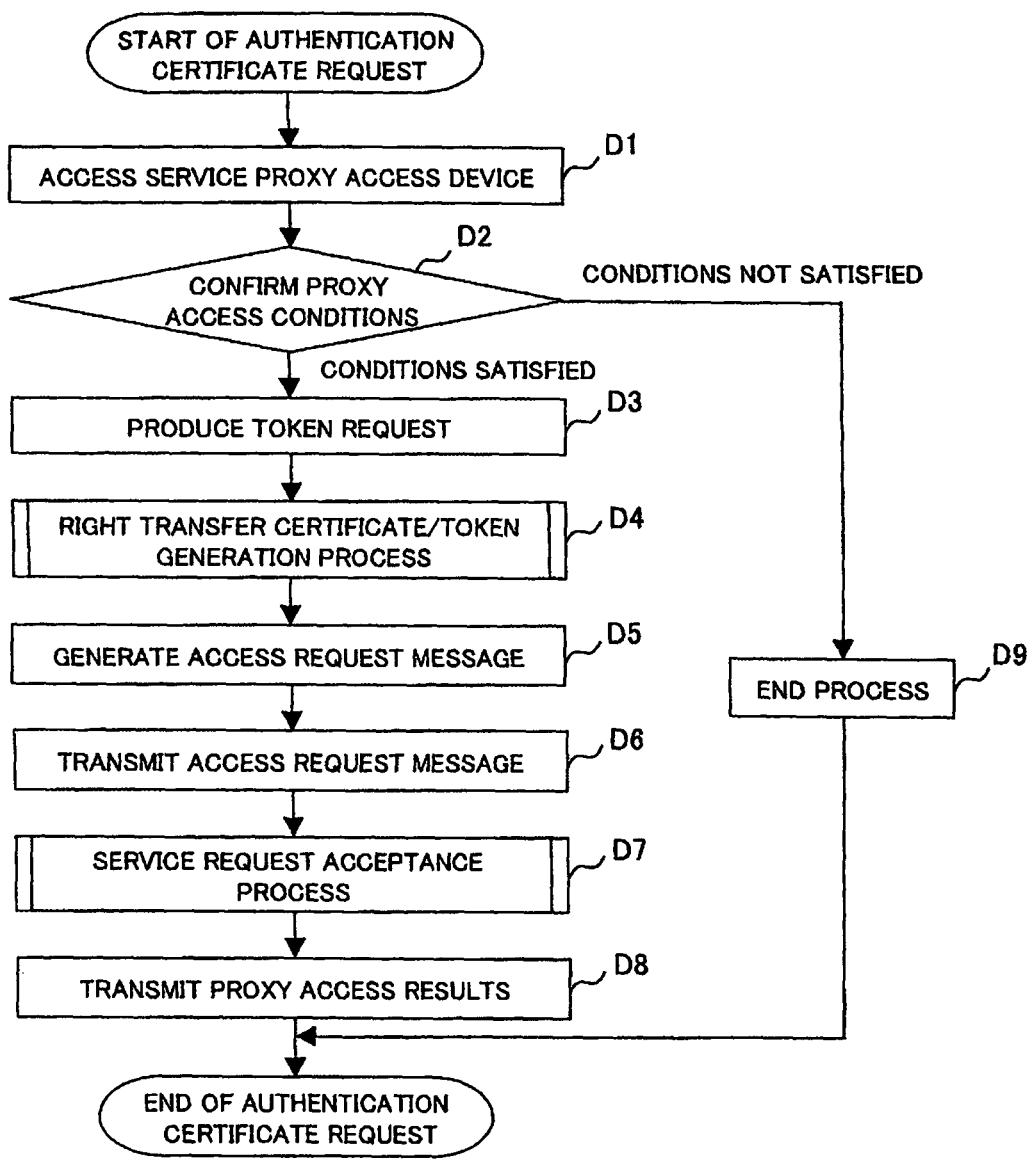
{FIG. 13} A flowchart illustrating a process concerning the service proxy access device when the service proxy access device acts as a proxy in accessing another service, according to the first exemplary embodiment.

The following describes an operation in which the service proxy access device 2 accesses the service providing device 3 with the user A's right in response to a request from the user B to whom the right is transferred from the user A, with reference to FIG. 13. FIG. 13 is a flowchart illustrating a process concerning the service proxy access device 2 when the service proxy access device 2 acts as a proxy in accessing another service.

First the user B accesses the user proxy access unit 32 of the service proxy access device 2 and requests the service proxy access device 2 to act as a proxy in accessing (Step D1). The user proxy access unit 32 checks the access right stored in the proxy access information storage unit 42 and makes a determination as to whether the user B is allowed to perform proxy access (whether the user B is allowed to use the service proxy access device 2) (Step D2). When the user B cannot perform, the process ends (Step D9). When the result of the determination at step D2 shows that proxy access is possible, the token request unit 33 generates a message to request the token for proxy access and transmits the generated message to the authentication device 1 along with the user authentication certificate (of the user B) kept in the user authentication certificate storage unit 41 (Step D3).

Then, the authentication device 1 generates the right transfer certificate and the token and transmits the token to the service proxy access device 2 (Step D4). The process of step D4 will be detailed later with reference to FIG. 14. After that, the token is registered in the token storage unit 43 through the token management unit 36. Then, the user proxy access unit 32 generates an access request message for the service providing device 3 (Step D5). Furthermore, the user proxy access unit 32 transmits the access request message and the token generated by the authentication device 1 to the service providing device 3 (Step D6).

The service providing device 3 transmits the service information to the service proxy access device 2 on the basis of the access request message (Step D7). The process of step D7 will be detailed later with reference to FIG. 15. Finally, the user proxy access unit 32 acquires information about the service and transmits the proxy access processing results to the user B (Step D8).

Figure 14:
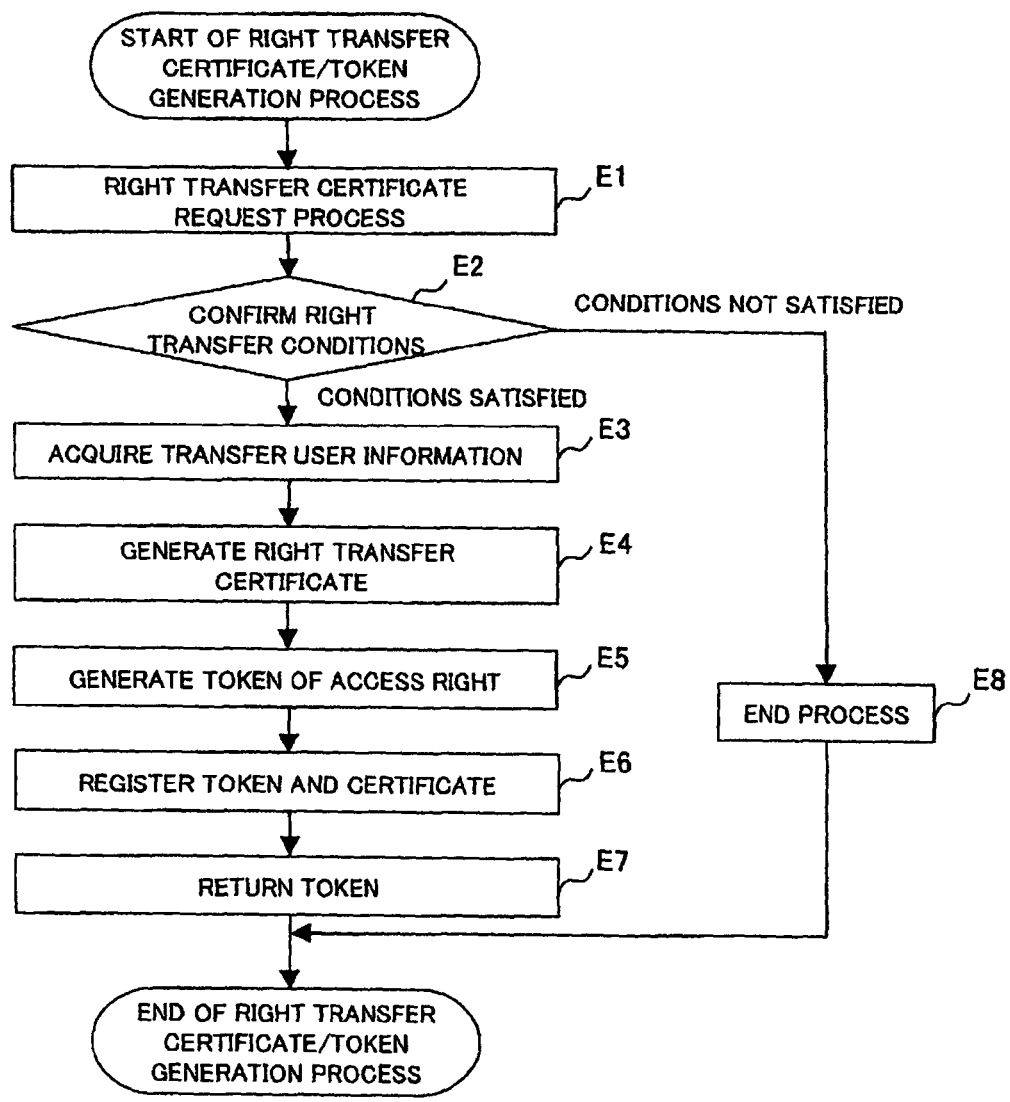
{FIG. 14} A flowchart illustrating a process concerning the authentication device when a right transfer certificate is issued and when a token pertaining to the certificate is issued, according to the first exemplary embodiment.

The following describes an operation of the authentication device 1 generating the right transfer certificate and the token with reference to FIG. 14. FIG. 14 is a flowchart illustrating a process concerning the authentication device when the right transfer certificate is issued and when the token pertaining to the certificate is issued.

First the right transfer certificate request acceptance unit 17 of the authentication device 1 acquires an issuance request message requesting the right transfer certificate to be issued and the user authentication certificate (of the user B) (Step E1). Then, the right user conversion unit 15 compares the information recorded in the issuance request message and the information recorded in the user authentication certificate (of the user B) with the information (conditions) stored in the right transfer condition storage unit 21 to make a determination as to whether it is possible to issue the right transfer certificate (concerning the user A) (Step E2). When the information recorded in the issuance request message or user authentication certificate does not meet the conditions, the process ends (Step E8). When the result of the determination at step E2 shows that it is possible to issue the certificate, the information about the user A who has transferred the right is acquired from the user information storage unit 20 on the basis of the information recorded in the issuance request message and the information managed by the right transfer condition storage unit 21 (Step E3).

Subsequently, the right transfer certificate/token generation unit 14 issues the right transfer certificate using the information about the user A acquired from the user information storage unit 20 (Step E4). The right transfer certificate/token generation unit 14 also issues the token corresponding to the right transfer certificate (Step E5). After that, the right transfer certificate/token management unit 16 registers the token and the right transfer certificate in the certificate storage unit 23 (Step E6). The right transfer certificate request acceptance unit 17 then transmits the generated token to the device that has requested the right transfer certificate (Step E7). As described above, the right transfer certificate/token generation unit 14 generates the right transfer information (which is specifically the right transfer certificate) and the token corresponding to the right transfer information on the basis of the right transfer conditions to issue to another device through the right transfer certificate request acceptance unit 17.

Figure 15:
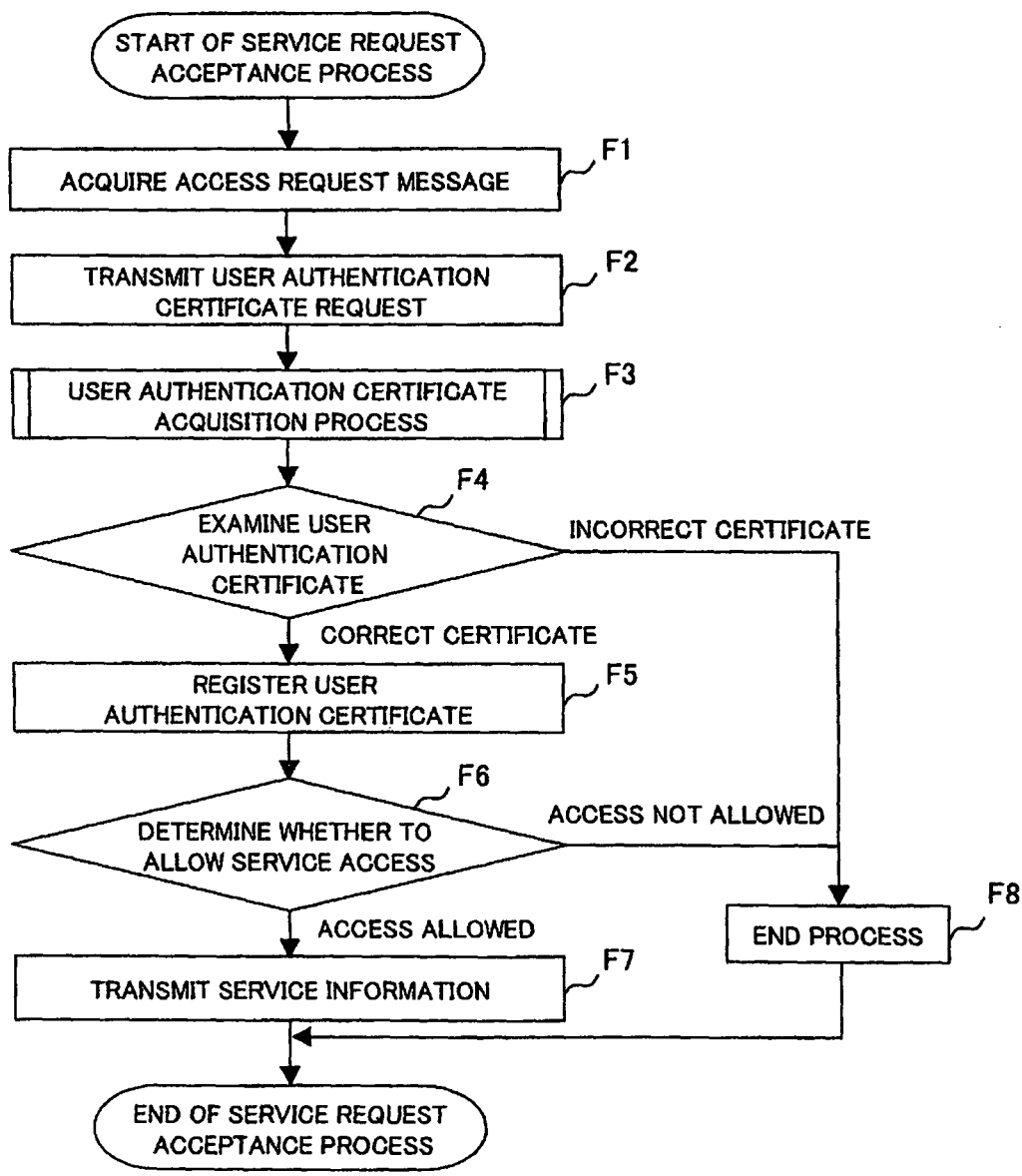
{FIG. 15} A flowchart illustrating a process concerning the service providing device that accepts proxy access, according to the first exemplary embodiment.

The following describes an operation of the service providing device 3 accepting access from another device, with reference to FIG. 15. FIG. 15 is a flowchart illustrating a process concerning the service providing device 3 that accepts proxy access.

The service access acceptance unit 50 of the service providing device 3 accepts a message that requests access to a service; the token acceptance unit 52 accepts the token (Step F1). Subsequently, the user authentication certificate request unit 53 uses the token accepted to generate a message that requests the user authentication certificate and transmits the message to the authentication device 1 (Step F2).

The authentication device 1 transmits the right transfer certificate to the service providing device 3 as the user authentication certificate of the user A (Step F3). The process of step F3 will be detailed later with reference to FIG. 16. The certificate examination unit 54 then examines the user authentication certificate transmitted from the authentication device 1 (Step F4). The steps taken for examination include: confirmation of the period of validity of the certificate, confirmation of the format of the certificate, confirmation of the issuer of the certificate, and the like. When it is determined that the user authentication certificate of the user A is not correct, the process ends (Step F8). When the result of the examination at step F4 shows that the certificate is correct, the user authentication certificate of the user A is registered in the certificate information storage unit 62 (Step F5).

Subsequently, the service access acceptance unit 50 compares the content recorded in the acquired user authentication certificate of the user A with the conditions managed by the access right condition storage unit 61 to make a determination as to whether the user A is allowed to access the service providing device 3 (Step F6). When it is determined that the user A is not allowed to access, the process ends (Step F8). When it is determined as a result of the process at step F6 that the user A is allowed to access, the service access acceptance unit 50 acquires information about the service from the service information storage unit 60 through the service information management unit 51 and transmits the acquired information to the device that is accessing (Step F7).

Figure 16:
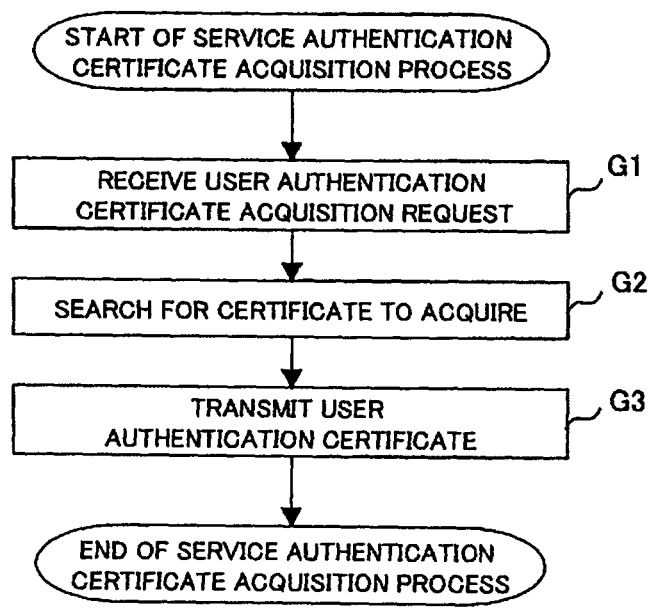
{FIG. 16} A flowchart illustrating a process concerning the authentication device when a certificate is acquired based on a token, according to the first exemplary embodiment.

The following describes an operation in which the authentication device 1 acquires the token and transmits the certificate with reference to FIG. 16. FIG. 16 is a flowchart illustrating a process concerning the authentication device when the certificate is acquired based on the token.

The certificate request acceptance unit 18 of the authentication device 1 receives, instead of the right transfer certificate, a message that requests the user authentication certificate and the token (Step G1). The certificate request acceptance unit 18 uses the token received to acquire the certificate corresponding to the token from the certificate storage unit 23 through the right transfer certificate/token management unit 16 (Step G2). The certificate request acceptance unit 18 subsequently transmits the certificate to the device that is accessing (Step G3).

As described above, in the access right management system of the present invention, the following devices are connected to each other through the network 6 as shown in FIG. 1: the authentication device 1 that transfers the right and issues the user certificate, the service proxy access device 2 that uses the user's right to access another provider, the service providing device 3 that confirms the user information after accepting access from another service and provides the service, the service access user terminal device 4 that the user to whom the right is transferred from another device uses to access the service, and the right setting user terminal device 5 that is used by the user who registers settings for transferring the right to another user.

As shown in FIG. 3, the authentication device 1 includes the user authentication certificate generation unit 12 that acquires, on the basis of the certificate request accepted by the user authentication certificate request acceptance unit 10, the information stored in the user information storage unit 20 through the user information management unit 11 and generates the user authentication certificate; the right transfer setting information acceptance unit 13 that accepts the right transfer setting information from the user terminal device and registers the right transfer setting information in the right transfer condition storage unit 21; the right transfer certificate/token generation unit 14 that generates, on the basis of the certificate request accepted by the right transfer certificate request acceptance unit 17, the user authentication certificate (referred to as a right transfer certificate), which is generated based on the right transfer setting information, and the token corresponding to the certificate by using the information acquired from the right user conversion unit 15 and the service providing device information storage unit 22; the certificate storage unit 23 that registers the token generated by the right transfer certificate/token generation unit 14 through the right transfer certificate/token management unit 16 in such a way that the token is associated with the certificate; and the certificate request acceptance unit 18 that searches for the certificate stored in the certificate storage unit 23 using the accepted token and returns the certificate to a requester.

As shown in FIG. 7, the service proxy access device 2 includes the user authentication certificate examination unit 34 that examines the user authentication certificate after the user authentication certificate request unit 31 acquires the user authentication certificate from the authentication device 1; the user authentication certificate management unit 35 that stores the user authentication certificate in the user authentication certificate storage unit 41; the token management unit 36 that compares the certificate information stored in the user authentication certificate storage unit 41 with the conditions for proxy access stored in the proxy access information storage unit 42 to make a determination as to whether the certificate information meets the conditions, requests the token concerning the access right through the token request unit 33 when the certificate information meets the conditions, and registers the acquired token in the token storage unit 43; and the user proxy access unit 32 that uses the token acquired by the token request unit 33 to act as a proxy in accessing another provider with the user's right.

As shown in FIG. 4, the service providing device 3 includes the service access acceptance unit 50 that acquires, when the conditions kept by the access right condition storage unit 61 are being satisfied, the information stored in the service information storage unit 60 through the service information management unit 51 and returns the information to the device that is accessing; and the user authentication certificate request unit 53 that acquires the certificate on the basis of the token acquired by the token acceptance unit 52, examines the certificate using the certificate examination unit 54, and keeps the certificate in the certificate information storage unit 62.

The certificate that the user authentication certificate request unit 53 acquires is referred to as a right transfer certificate in the authentication device 1. Since there is the right transfer setting information in the authentication device 1, it is determined that the certificate is the one (right transfer certificate) used for transferring the right. However, in the service providing device 3, the certificate is the one on which user information is recorded, and there is no information about the transfer of the right. Since the certificate is not judged to be a right transfer certificate in the service providing device 3, the certificate is regarded as a user authentication certificate. Both represent the same thing. However, since the information retained as a premise is different, the certificate is called differently.

Such a configuration is adopted. The user who transfers the right to another user sets the right conditions in the authentication device 1 through the right setting user terminal device 5. After that, the user to whom the right is transferred accesses the service proxy access device 2 through the service access user terminal device 4. The service proxy access device 2 requests the authentication device 1 to issue the right transfer certificate and the token. Furthermore, the service proxy access device 2 accesses the service providing device 3 to transmit the token. The service providing device 3 uses the token to acquire the certificate of the user who transfers the right from the authentication device 1 and controls access by using the certificate of the user who transfers the right. Thus, the objective of the present invention is achieved.

The effects of the present exemplary embodiment will be described. According to the present exemplary embodiment, the authentication device 1 is so configured as to selectively transmit an appropriate user authentication certificate depending on what device is accessing. Therefore, it is not necessary to transmit unnecessary user information, thereby reducing the risk that the information will leak.

Moreover, according to the present exemplary embodiment, the user (user A) who transfers the right sets the right transfer conditions only in the authentication device 1; the service providing device 3 is so configured as to determine whether to allow access for the user (user A) who transfers the right, not for the user (user B) to whom the right is transferred. Accordingly, what the user A who transfers the right does is to set the right transfer conditions only in one spot. As a result, it is possible to save a lot of time and effort for the setting of the right.

Furthermore, according to the present exemplary embodiment, the user who transfers the right inputs the right transfer conditions into the authentication device 1. Accordingly, the setting of right transfer is possible as the user desires by soliciting confirmation and agreement from the user.

Second Exemplary Embodiment

Figure 17:
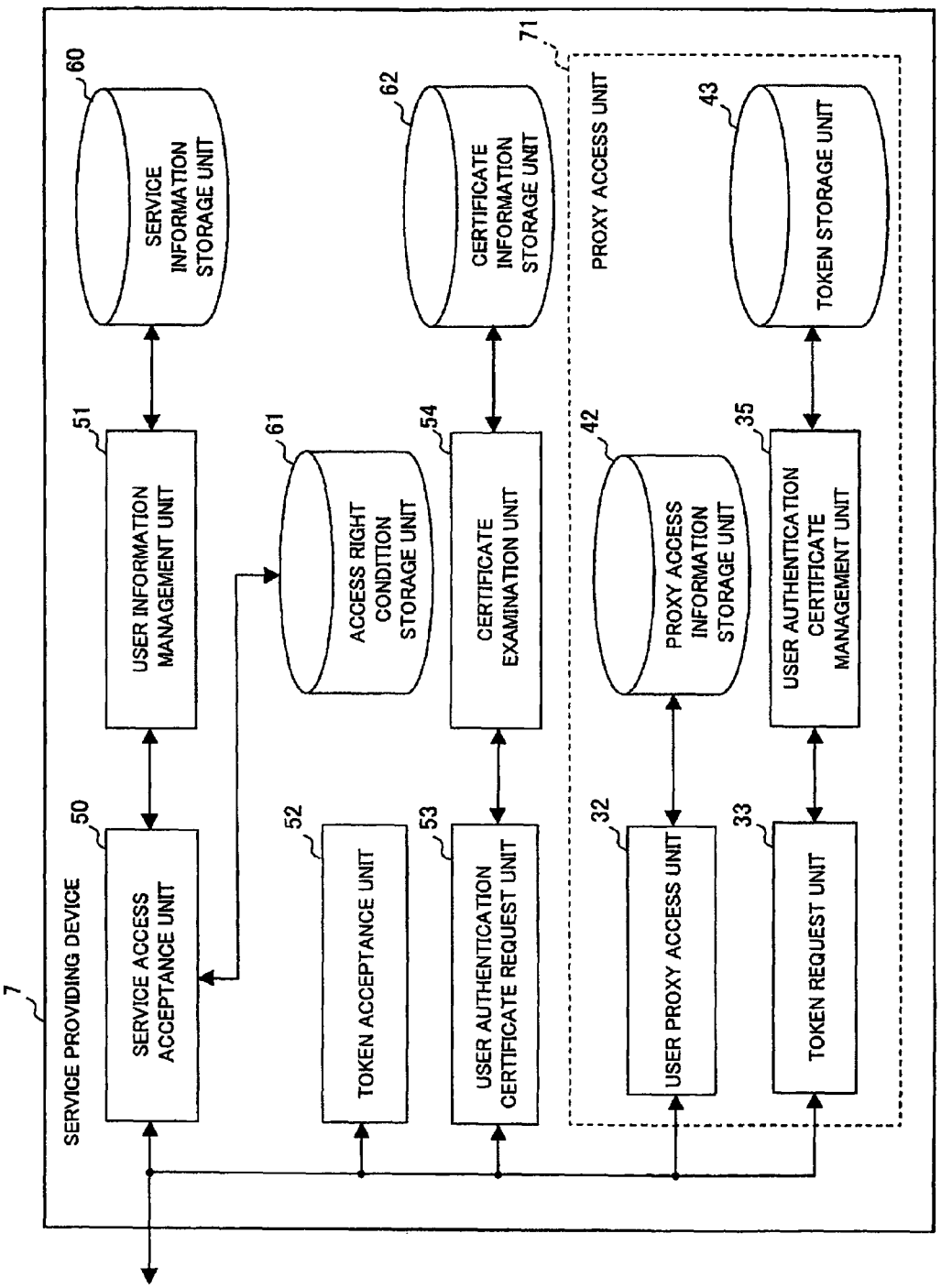
{FIG. 17} A block diagram illustrating the configuration of a service providing device, according to a second exemplary embodiment of the present invention.

The following describes a second exemplary embodiment of the present invention with reference to the accompanying drawings. FIG. 17 is a block diagram illustrating the configuration of a service providing device 7, which is a service providing device, according to the second exemplary embodiment of the present invention. As shown in FIG. 17, the difference between the service providing device 7 of the second exemplary embodiment and the service providing device 3 of the first exemplary embodiment illustrated in FIG. 8 is that the service providing device 7 has, as well as the components of the service providing device 3, a proxy access unit 71. The overall configuration is the same as the configuration illustrated in FIG. 1, even though the service providing device 7 exists instead of or in addition to the service providing device 3.

The proxy access unit 71 includes a user proxy access unit 32, a token request unit 33, a proxy access information storage unit 42, and a token storage unit 43. The units of the proxy access unit 71 operate in the same way as the user proxy access unit 32, token request unit 33, proxy access information storage unit 42, and token storage unit 43 of the service proxy access device 2 of the first exemplary embodiment illustrated in FIG. 4.

The process in which the right setting user terminal device 5 sets the transfer of the right in the authentication device 1 and the process in which the service proxy access device 2 acquires the user authentication certificate from the authentication device 1 are the same as the operations of the first exemplary embodiment as illustrated in FIGS. 10, 11 and 12. Moreover, the operation of the service proxy access device 2 acquiring the token after requesting the authentication device 1 to issue the certificate concerning the right for proxy access and transmitting the access request message to the service providing device 7 is the same as the operation of the first exemplary embodiment (the processes of step D1 to D6 in FIG. 13). However, the operation of the service providing device 7 receiving a proxy access request is different from the operation of the first exemplary embodiment as illustrated in the flowchart of FIG. 18.

Figure 18:
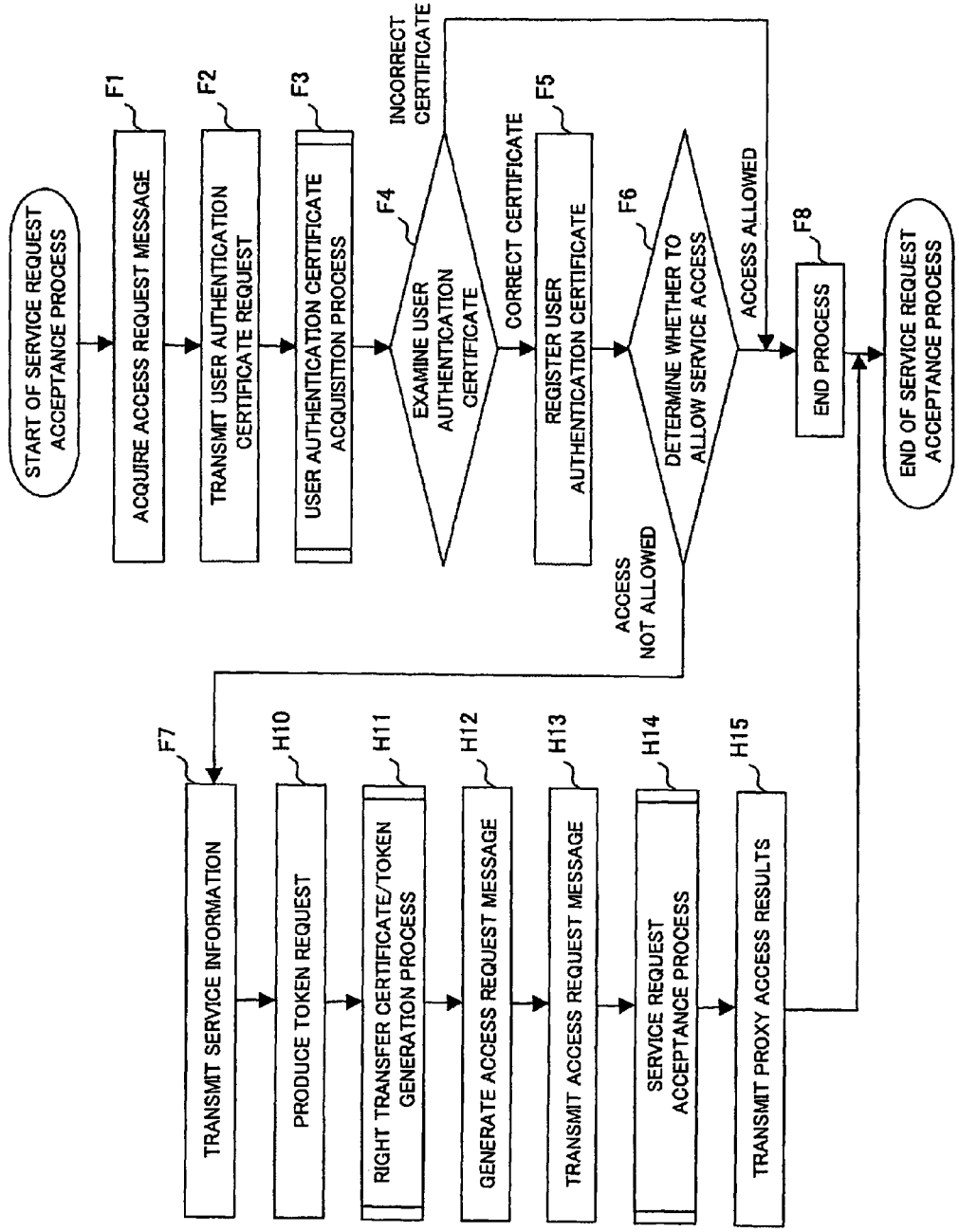
{FIG. 18} A flowchart illustrating a process concerning the service providing device that accepts proxy access, according to the second exemplary embodiment.

The following describes the overall operation of the present exemplary embodiment with reference to the flowchart of FIG. 18.

After acquiring an access request, the service providing device 7 acquires the user authentication certificate from the authentication device 1 and makes a determination as to whether to provide a service (Step F1 to F7). The processes of steps F1 to F7 are the same as the operation of the service providing device 3 of the first exemplary embodiment illustrated in FIG. 15.

According to the second exemplary embodiment, when the service providing device 7 transmits the service information, the service providing device 7 acts as a proxy in accessing another service device. To allow proxy access, the token request unit 33 of the service providing device 7 transmits to the authentication device 1 the user authentication certificate acquired by the process of step F3 and also transmits a token issuance request message in order to make proxy access possible (Step H10). After receiving the token issuance request, the authentication device 1 issues the certificate and the token corresponding to the certificate and transmits the certificate and the token to the service providing device 7 (Step H11). The process of step H11 is the same as the process of the authentication device 1 of the first exemplary embodiment illustrated in FIG. 14.

After the service providing device 7 acquires the token, the token management unit 36 registers the token in the token storage unit 43. Moreover, the user proxy access unit 32 uses the information stored in the proxy access information storage unit 42 to produce an access request message for proxy access to another service providing device (step H12). The user proxy access unit 32 then transmits the access request message to another service providing device (step H13).

After receiving the access request message, the service providing device performs the same process as the process of the service providing device 3 illustrated in FIG. 15 or a service request acceptance process which is the same process as the process of the service providing device 7 illustrated in FIG. 18 (Step H14). After that, the user proxy access unit 32 transmits the results of proxy access to the device that is accessing the service providing device 7 (Step H15).

The effects of the second exemplary embodiment will be described. According to the second exemplary embodiment, the information about the right transfer conditions kept in the authentication device 1 is reused by the service access user terminal device 4; the service usage device 7 to which the right is transferred is so configured as to re-transfer the right to another service usage device. Accordingly, the service proxy access device 2 is able to set the transfer of the right without taking into account entrusting the right to another service usage device again. Therefore, the right transfer process of the service proxy access device 2 becomes simple.

Third Exemplary Embodiment

Figure 19:
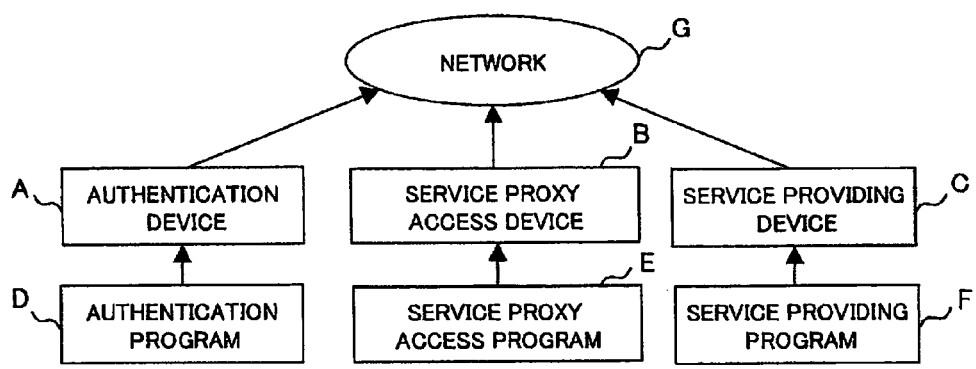
{FIG. 19} A block diagram outlining a third exemplary embodiment of the present invention.

The following describes a third exemplary embodiment of the present invention with reference to the accompanying drawings. FIG. 19 is a block diagram illustrating the overall configuration of the third exemplary embodiment. As shown in FIG. 19, like the first and second exemplary embodiments, the third exemplary embodiment is equipped with an authentication device A that can communicate through a network G, a service proxy access device B, and a service providing device C. Incidentally, the authentication device A is equivalent to the authentication device 1 of the first and second exemplary embodiments. The service proxy access device B is equivalent to the service proxy access device 2. The service providing device C is equivalent to the service providing device 3 or service providing device 7 of the first and second exemplary embodiments.

The authentication device A, the service proxy access device B and the service providing device C each include a CPU. An authentication program D is a program to control the operation of the authentication device A, issue the certificate in response to a request from the service proxy access device B or service providing device C, and issue the token. The authentication device A carries out a control process in accordance with the authentication program D, thereby performing the same processes as the processes of the authentication device 1 of the first and second exemplary embodiments.

A service proxy access program E is a program to control the operation of the service proxy access device B, acquire the certificate and the token from the authentication device A, and access the service providing device C. The service proxy access device B carries out a control process in accordance with the service proxy access program E, thereby performing the same processes as the processes of the service proxy access device 2 of the first and second exemplary embodiments.

A service providing program F is a program to control the operation of the service providing device C, acquire the certificate from the authentication device A, and provide a service to the service proxy access device B. The service providing device C carries out a control process in accordance with the service providing program F, thereby performing the same processes as the processes of the service providing devices 3 and 7 of the first and second exemplary embodiments.

EXAMPLES

Example 1

The following describes Example 1 of the present invention with reference to the accompanying drawings. Example 1 is an example corresponding to the first exemplary embodiment of the present invention.

Figure 20:
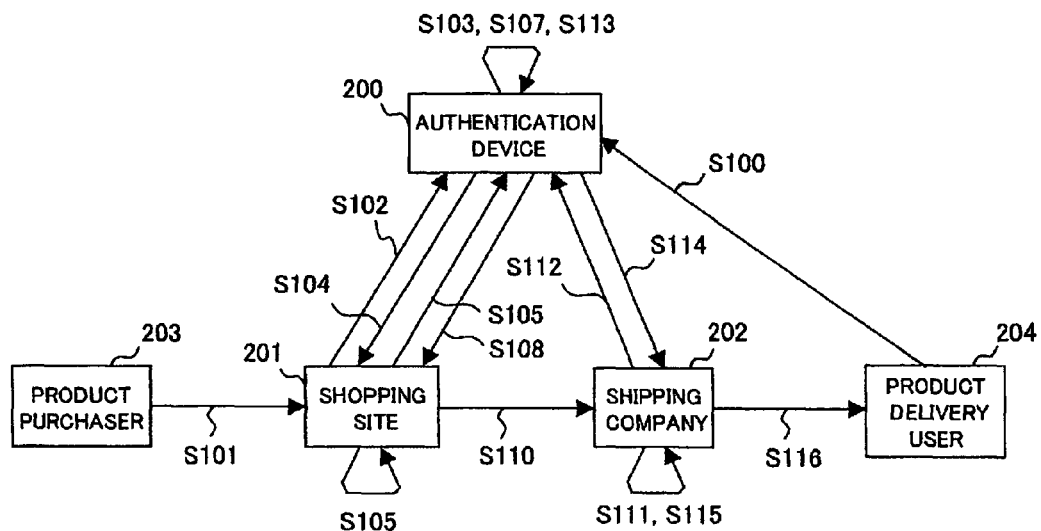
{FIG. 20} A configuration diagram illustrating the configuration of an access management system in Example 1 of the present invention.

FIG. 20 is a configuration diagram illustrating the configuration of an access management system in Example 1. As shown in FIG. 20, the access right management system includes an authentication device 200, a shopping site 201, and a shipping company 202 (which is, more specifically, a server device or the like in the shipping company). Also illustrated in FIG. 20 are a product purchaser 203 and a user 204 to whom a product will be delivered.

The authentication device 200 is a device that manages user information on the Internet and distributes the certificate. The shopping site 201 is a device that acts as a service proxy access device. The shipping company 202 (which is, more specifically, a server device or the like in the shipping company) is a device that acts as a service providing device. The product purchaser 203 accesses the network through the service access user terminal device. The product delivery user 204 accesses the network through the right setting user terminal device.

In the present example, the product purchaser 203 buys a product on the shopping site 202 and requests the shipping company 202 to deliver the product as a present to the product delivery user 204 by using the right of the product delivery user 204. The shipping company 202 delivers the product. In the present example, the authentication device is supposed to be an organization that manages user information, such as ISP (Internet Service Provider) and carrier.

The shipping company 202 in the present example is already controlling the address to which the product is delivered. The product delivery user 204 has the right of accessing the address. In the present example, the right of accessing the address to which the product is delivered is transferred among users or devices.

The product delivery user 204 notifies the authentication device 200 that the product delivery user 204 allows transferring the right of accessing the address controlled by the shipping company 202 to the product purchaser 203 (Step S100 in FIG. 20). Based on the notification, it becomes possible for the product purchaser to deliver to the product delivery user the product the product purchaser has bought as a present.

Under the circumstances described above, the product purchaser 203 accesses the shopping site 201 (Step S101 in FIG. 20). The shipping site 201 transmits a user authentication certificate request to the authentication device 200 in order to acquire information about the user who is accessing (Step S102 in FIG. 20). After receiving the request, the authentication device 200 issues the user authentication certificate (Step S103 in FIG. 20) and transmits the user authentication certificate to the shopping site 201 (Step S104 in FIG. 20). Since the user can be identified from the user authentication certificate, the shopping site 201 performs a product purchase process in accordance with access from the product purchaser 203 and a product shipping process (Step S105 in FIG. 20).

The shopping site 201 requests from the authentication device 200 the right of requesting the shipping company 202 to ship the product (Step S106 in FIG. 20). After receiving the request for issuing of the right certificate, the authentication device 200 makes a determination as to whether the product purchaser 203 is able to access the address of the product delivery user 204 controlled by the shipping company 202. When the access is allowed, the authentication device 200 issues the user authentication certificate concerning the product delivery user 204 for the shipping company 202 and also issues the token (Step S107 in FIG. 20).

Subsequently, the authentication device 200 transmits the issued token to the shopping site 201 (Step S108 in FIG. 20). After receiving the token, the shopping site transmits a product shipment request as well as the token (Step S110 in FIG. 20). After receiving the product shipment request, the shipping company 202 confirms whose right the request uses to access (S111 in FIG. 20). However, at this stage, there is no user authentication certificate; only the token is received. Accordingly, the shipping company 202 transmits the token to the authentication device 200 and requests the certificate (Step S112 in FIG. 20). The authentication device 200 searches for the certificate using the received token and acquires the certificate (Step S113 in FIG. 20). The authentication device 200 then transmits the certificate to the shipping company 202 that is requesting the certificate (Step S114 in FIG. 20).

After receiving the certificate, the shipping company 202 checks the right to make a determination as to whether it is possible to access the address of the product delivery user 204 (Step S115 in FIG. 20). When the access is possible, the address of the product delivery user is available. Therefore, in response to the request from the shopping site 201, the shipping company 202 ships the product to the product delivery user 204.

In the present example, all the shopping site and the shipping company do is to exchange the token concerning the user's right; the shopping site and the shipping company do not exchange a document on which user information such as user ID is recorded. Moreover, all the product delivery user 204 does is to set the transfer of the right only in the authentication device 200; the product delivery user 204 does not have to distribute the transfer conditions to a plurality of devices.

Example 2

The following describes Example 2 of the present invention with reference to the accompanying drawings. Example 2 is an example corresponding to the second exemplary embodiment of the present invention.

Figure 21:
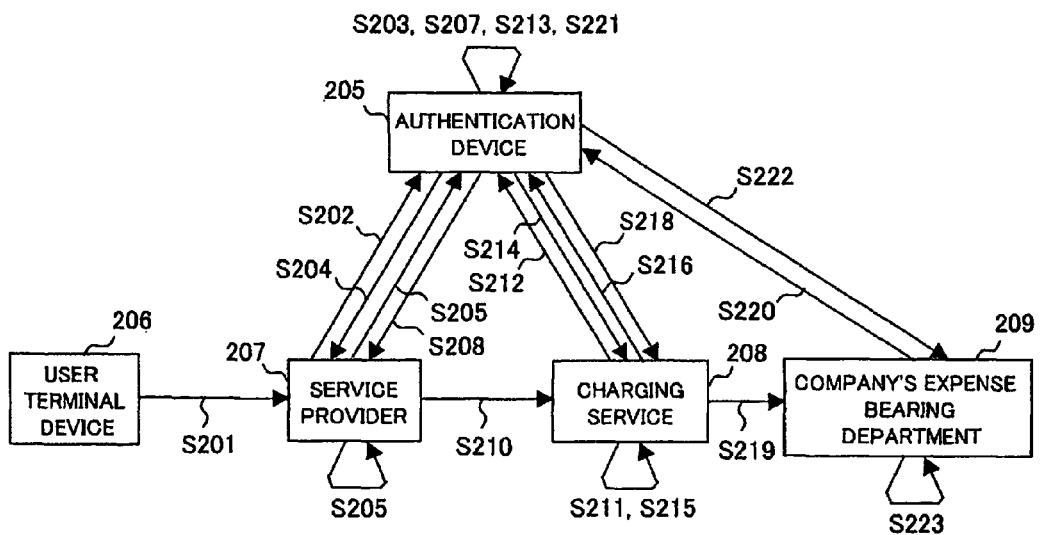
{FIG. 21} A configuration diagram illustrating the configuration of an access management system in Example 2 of the present invention.
Figure 22:
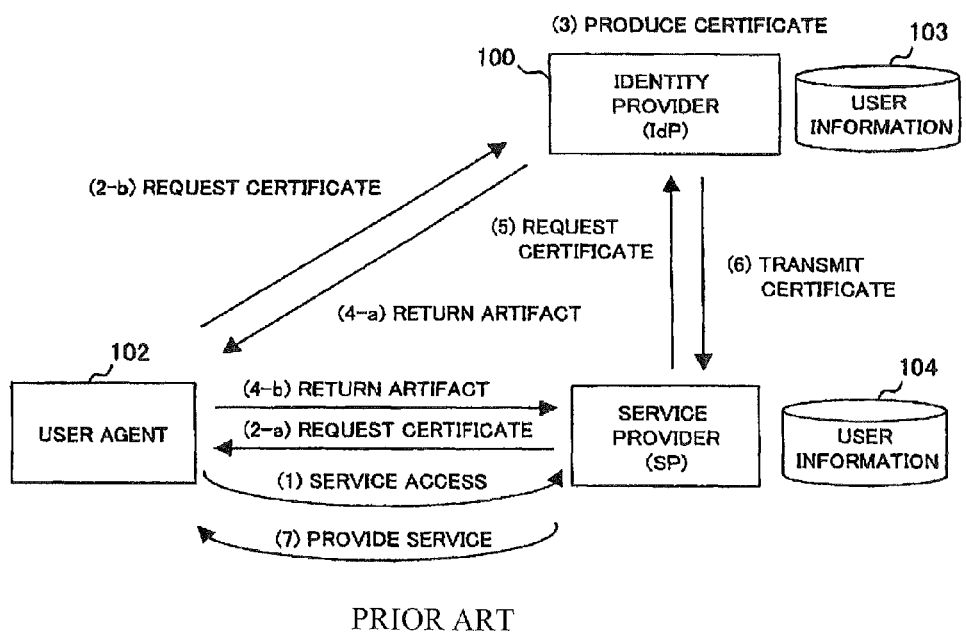
{FIG. 22} A configuration diagram illustrating the configuration of a system that realizes distribution of certificates as disclosed in NPL 1.
Figure 23:
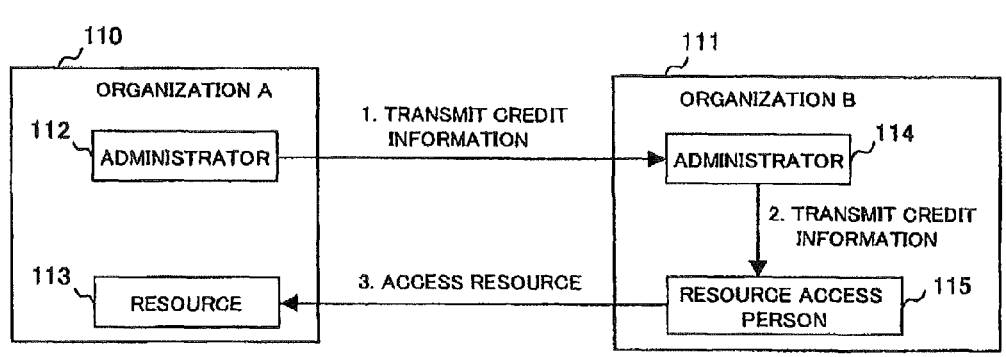
{FIG. 23} An explanatory diagram illustrating an access management system that realizes a transfer of rights as disclosed in PTL 1.

FIG. 21 is a configuration diagram illustrating the configuration of an access management system in Example 2. As shown in FIG. 21, the access right management system includes an authentication device 205, a service provider 207, a charging service 208 (which is, more specifically, a server device or the like in the charging service provider) and an expense bearing department 209 (which is, more specifically, a server device or the like in the expense bearing department).

The authentication device 205 is a device that manages user information on the Internet and distributes the certificate. The service provider 207 is a device that acts as a service proxy access device. The charging service 208 (which is, more specifically, a server device or the like in the charging service provider) is a device that acts as a service providing device for providing a service and proxy access. A user terminal device 206 is a device that an employee uses to access the network through the service access user terminal device. The expense bearing department 209 is a department of a company that performs a payment process in response to a request for a charging service. More specifically, a communication process with others and other processes in the expense bearing department 209 are performed by the server device of the expense bearing department 209 and the like.

In the present example, an administrator of the company's expense bearing department 209 sets the access right of the charging service for employees through the right setting user terminal device. In the present example, a user uses the service provider 207 with the user's right; the company's expense bearing department 209, however, pays a service usage fee thereof. The charging service 208 performs a charging process to charge the service usage fee. The service provider 207 uses the right the company's expense bearing department 209 has to request the charging service to charge the fee. The charging service 208 uses the right the service provider 207 has to ask the company's expense bearing department 209 for payment.

A user who has an employee's right accesses the service provider 207 through the user terminal device 206 (Step S201 in FIG. 21). The service provider 207 transmits a user authentication certificate request to the authentication device 205 in order to acquire information about the user who is accessing (Step S202 in FIG. 21). After receiving the request, the authentication device 205 issues the user authentication certificate (Step S203 in FIG. 21) and transmits the user authentication certificate to the service provider 207 (Step S204 in FIG. 21). Since the user can be identified from the user authentication certificate, the service provider 207 provides a service to the user (Step S205 in FIG. 21).

The service provider 207 then requests from the authentication device 205 the right of requesting the charging service 208 to perform the charging process (Step S206 in FIG. 21). After receiving the request for issuing of the right certificate, the authentication device 200 issues the user authentication certificate on which information about the expense bearing department 209 of the company the user works for is recorded and also issues the token (Step S207 in FIG. 21). Subsequently, the authentication device 205 transmits the issued token to the service provider 207 (Step S208 in FIG. 21). After receiving the token, the service provider 207 transmits a charging request as well as the token (Step S210 in FIG. 21). After receiving the charging request, the charging service 208 confirms to whom the charging service 208 charges the fee (Step 211 in FIG. 21).

However, at this stage, there is no user authentication certificate; the charging service 208 has received only the token. Accordingly, the charging service 208 transmits the token to the authentication device 205 to request the certificate (Step S212 in FIG. 21). The authentication device 205 searches for the certificate using the received token to acquire the certificate (Step S213 in FIG. 21). Then, the authentication device 205 transmits the certificate to the charging service 208 that is requesting the certificate (Step S214 in FIG. 21). After receiving the certificate, the charging service 208 confirms the right before performing the charging process (Step S215 in FIG. 21).

When the charging service 208 transmits a bill to the company's expense bearing department 209, the charging service 208 accesses the expense bearing department 209 on behalf of the service provider 207. Accordingly, the charging service 208 transmits to the authentication device 205 a request for issuing the certificate concerning the right of accessing the expense bearing department 209 (Step S216 in FIG. 21). After the authentication device 205 receives the certificate issuance request, the service provider 207 issues the certificate for accessing the expense bearing department 209 as well as the token (Step S217 in FIG. 21). Subsequently, the authentication device 205 transmits the token to the charging service 208 (Step S218 in FIG. 21).

After receiving the token, the charging service 208 transmits the token received and a payment bill to the company's expense bearing department 209 (Step S219 in FIG. 21). After accepting the payment bill, the expense bearing department 209 transmits to the authentication device 205 a certificate request message and the received token in order to confirm from which service the request comes from (Step S220 in FIG. 21). The authentication device 205 acquires the certificate associated with the received token (Step S221 in FIG. 21). The authentication device 205 then transmits the certificate to the expense bearing department 209 that is requesting the certificate (Step S222 in FIG. 21). After receiving the certificate, the expense bearing department 209 confirms the certificate and the payment bill before completing a payment process (Step S223 in FIG. 21).

The present application is based on Japanese Patent Application No. 2007-335988 (filed on Dec. 27, 2007). Moreover, the present application claims priority under the Paris Convention from Japanese Patent Application No. 2007-335988, the entire content of which being incorporated herein by reference.

Although the exemplary embodiments of the present invention have been described in detail, it is to be understood that the exemplary embodiments are capable of various changes, substitutions and alternatives without departing from the spirit and scope of the invention as defined in the claims. If claims are corrected in the procedure of application, the inventor intends the range of equivalency of the claims of the invention to be maintained.

INDUSTRIAL APPLICABILITY

The present invention can be applied to a case where a user uses a right transferred from another user to allow a service provider to carry out proxy access under a situation in which a plurality of service providers work closely with each other to provide services to users. The present invention may also be applied to a certificate management system or right transfer management system in a distributed system that is built on a network, such as an Internet service, an intra-firm system, a business-to-business system and a carrier system, and to a program that allows computers to realize a right management system.

The invention claimed is:

1. An access right management system, comprising:
an authentication device that manages a condition under which a right is transferred;
a service providing device that provides a service in a response to a service request; and
a service proxy access device that acts as a proxy in accessing the service providing device,
the authentication device, the service providing device, and the service proxy access device being implemented using hardware,
wherein the authentication device includes:
a user authentication certificate generation unit that issues to the service providing device user authentication information on which information about a user is recorded; and
a right transfer certificate/token generation unit that issues to the service proxy access device right transfer information and a token corresponding to the right transfer information on a basis of information about a user to whom the right is transferred and the condition under which the right is transferred, the condition being set by a user who transfers the right,
wherein the service proxy access device includes:
a token request unit that requests the issuing of the right transfer information and the token to the authentication device in order to access the service providing device; and
a user proxy access unit that accesses the service providing device using the token, and
wherein the service providing device includes:
a user authentication certificate request unit that uses the token to acquire the user authentication information from the authentication device.

2. The access right management system according to claim 1, wherein the service providing device further includes:
a token request unit that requests the issuing of the right transfer information and the token to act as a proxy for the user recorded in the user authentication information in accessing another service providing device; and
a user proxy access unit that uses the token for said another service providing device to access another service.

3. The access right management system according to claim 1, wherein the authentication device further includes a right transfer condition storage unit that stores a condition under which an access right is transferred that is set by a user who transfers the right, and
wherein the right transfer certificate/token generation unit issues the right transfer information and the token corresponding to the right transfer information on a basis of the condition under which the right is transferred that is stored in the right transfer condition storage unit.

4. The access right management system according to claim 1, wherein the authentication device further includes:
a certificate storage unit that keeps the right transfer information issued by the right transfer certificate/token generation unit and the token corresponding to the right transfer information; and
a certificate request acceptance unit that receives the token and acquires from the certificate storage unit the right transfer information corresponding to the token received.

5. The access right management system according to claim 1, wherein:
the authentication device includes a right user conversion unit that makes a determination as to whether to allow an access right to be transferred to another user; and
the right transfer certificate/token generation unit issues the right transfer information and the token corresponding to the right transfer information when the right user conversion unit determines to allow the transfer of the right.

6. The access right management system according to claim 2, wherein the authentication device further includes a right transfer condition storage unit that stores a condition under which an access right is transferred that is set by a user who transfers the right, and wherein the right transfer certificate/token generation unit issues the right transfer information and the token corresponding to the right transfer information on a basis of the condition under which the right is transferred that is stored in the right transfer condition storage unit.

7. The access right management system according to claim 4, wherein the authentication device further includes a right transfer condition storage unit that stores a condition under which an access right is transferred that is set by a user who transfers the right, and wherein the right transfer certificate/token generation unit issues the right transfer information and the token corresponding to the right transfer information on a basis of the condition under which the right is transferred that is stored in the right transfer condition storage unit.

8. The access right management system according to claim 5, wherein the authentication device further includes a right transfer condition storage unit that stores a condition under which an access right is transferred that is set by a user who transfers the right, and wherein the right transfer certificate/token generation unit issues the right transfer information and the token corresponding to the right transfer information on a basis of the condition under which the right is transferred that is stored in the right transfer condition storage unit.

9. The access right management system according to claim 2, wherein the authentication device includes a right user conversion unit that makes a determination as to whether to allow an access right to be transferred to another user, and wherein the right transfer certificate/token generation unit issues the right transfer information and the token corresponding to the right transfer information when the right user conversion unit determines to allow the transfer of the right.

10. The access right management system according to claim 4, wherein the authentication device includes a right user conversion unit that makes a determination as to whether to allow an access right to be transferred to another user, and wherein the right transfer certificate/token generation unit issues the right transfer information and the token corresponding to the right transfer information when the right user conversion unit determines to allow the transfer of the right.

11. An access right management method for enabling an authentication device that manages a right transfer condition and issues user authentication information to generate and distribute information about a transfer of a right and a token to a service providing device that provides a service in a response to a service request and a service proxy access device that acts as a proxy in accessing the service providing device, the method comprising:

at the authentication device,
generating, for the service providing device, user authentication information on which information about a user is recorded and issues to the service proxy access device right transfer information and a token corresponding to the right transfer information on a basis of information about a user to whom the right is transferred and a condition under which the right is transferred, the condition being set by a user who transfers the right;

at the service proxy access device,
requesting the issuing of the right transfer information and the token to the authentication device in order to access the service providing device and accesses the service providing device using the token; and at the service providing device,
using the token to acquire the user authentication information from the authentication device.

12. The access right management method according to claim 11, further comprising:
at the authentication device,
setting a condition under which an access right is transferred to another user, stores a condition under which the access right is transferred that is set by a user, keeps in a certificate storage unit the right transfer information and the token corresponding to the right transfer information that are issued by a right transfer certificate/token generation, and acquires from the certificate storage unit the right transfer information corresponding to the token received after receiving the token.

13. The access right management method according to claim 11, further comprising:
at the service proxy access device,
acquiring the user authentication information of a user who is accessing and keeps the user authentication information acquired.

14. The access right management method according to claim 11, further comprising:
at the service providing device,
receiving the token in order to acquire information about the user from the service proxy access device, makes a determination as to whether to allow access to service information by examining the information about the user, and keeps a service to be provided to another device.

15. The access right management method according to claim 14, further comprising:
at the service providing device,
requesting the issuing of the right transfer information and the token in order to access another device and accesses another service using the token.

16. The access right management method according to claim 13, further comprising:
at the authentication device,
setting a condition under which an access right is transferred to another user, stores a condition under which the access right is transferred that is set by a user, keeps in a certificate storage unit the right transfer information and the token corresponding to the right transfer information that are issued by a right transfer certificate/token generation, and acquires from the certificate storage unit the right transfer information corresponding to the token received after receiving the token.

17. The access right management method according to claim 14, further comprising:
at the authentication device,
setting a condition under which an access right is transferred to another user, stores a condition under which the access right is transferred that is set by a user, keeps in a certificate storage unit the right transfer information and the token corresponding to the right transfer information that are issued by a right transfer certificate/token generation, and acquires from the certificate storage unit the right transfer information corresponding to the token received after receiving the token.

\* \* \* \* \*